(12) United States Patent
Ackley et al.

(10) Patent No.: US 9,897,434 B2
(45) Date of Patent: Feb. 20, 2018

(54) HANDHELD DIMENSIONING SYSTEM WITH MEASUREMENT-CONFORMANCE FEEDBACK

(71) Applicant: Hand Held Products, Inc., Fort Mill, SC (US)

(72) Inventors: H. Sprague Ackley, Seattle, WA (US); Franck Laffargue, Toulouse (FR)

(73) Assignee: Hand Held Products, Inc., Fort Mill, SC (US)

(*) Notice: Subject to any disclaimer, the term of this patent is extended or adjusted under 35 U.S.C. 154(b) by 315 days.

(21) Appl. No.: 14/519,249

(22) Filed: Oct. 21, 2014

(65) Prior Publication Data
US 2016/0109219 A1    Apr. 21, 2016

(51) Int. Cl.
| H04N 13/02 | (2006.01) |
| G01B 11/02 | (2006.01) |
| G01B 11/00 | (2006.01) |
| G01F 17/00 | (2006.01) |

(52) U.S. Cl.
CPC ............ *G01B 11/022* (2013.01); *G01B 11/00* (2013.01); *G01B 11/026* (2013.01); *G01F 17/00* (2013.01)

(58) Field of Classification Search
CPC ...... G01B 11/022; G01B 11/026; G01F 17/00
See application file for complete search history.

(56) References Cited

U.S. PATENT DOCUMENTS

| 3,971,065 A | 7/1976 | Bayer |
| 4,279,328 A | 7/1981 | Ahlbom |
| 4,398,811 A | 8/1983 | Nishioka et al. |
| 4,495,559 A | 1/1985 | Gelatt, Jr. |
| 4,730,190 A | 3/1988 | Win et al. |
| 4,803,639 A | 2/1989 | Steele et al. |
| 5,184,733 A | 2/1993 | Amarson et al. |
| 5,220,536 A | 6/1993 | Stringer et al. |
| 5,331,118 A | 7/1994 | Jensen |
| 5,359,185 A | 10/1994 | Hanson |
| 5,384,901 A | 1/1995 | Glassner et al. |
| 5,548,707 A | 8/1996 | LoNegro |
| 5,555,090 A | 9/1996 | Schmutz |
| 5,561,526 A | 10/1996 | Huber et al. |
| 5,590,060 A | 12/1996 | Granville et al. |

(Continued)

FOREIGN PATENT DOCUMENTS

| AU | 2004212587 A1 | 4/2005 |
| CN | 201139117 Y | 10/2008 |

(Continued)

OTHER PUBLICATIONS

U.S. Appl. No. 14/519,179, Serge Thuries et al., filed Oct. 21, 2014, not published yet. 40 pages.

(Continued)

*Primary Examiner* — Tsion B Owens
(74) *Attorney, Agent, or Firm* — Additon, Higgins & Pendleton, P.A.

(57) ABSTRACT

A system and method for obtaining a dimension measurement that conforms to a conformance criteria is disclosed. The dimensioning system provides either (i) feedback to confirm that the measurement complies with the criteria or (ii) information on how the measurement geometry could be adjusted in order to provide a compliant measurement in a subsequent dimension measurement.

32 Claims, 3 Drawing Sheets

(56) References Cited

U.S. PATENT DOCUMENTS

| | | |
|---|---|---|
| 5,606,534 A | 2/1997 | Stringer et al. |
| 5,619,245 A | 4/1997 | Kessler et al. |
| 5,655,095 A | 8/1997 | LoNegro et al. |
| 5,661,561 A | 8/1997 | Wurz et al. |
| 5,699,161 A | 12/1997 | Woodworth |
| 5,729,750 A | 3/1998 | Ishida |
| 5,730,252 A | 3/1998 | Herbinet |
| 5,732,147 A | 3/1998 | Tao |
| 5,734,476 A | 3/1998 | Dlugos |
| 5,737,074 A | 4/1998 | Haga et al. |
| 5,748,199 A | 5/1998 | Palm |
| 5,767,962 A | 6/1998 | Suzuki et al. |
| 5,831,737 A | 11/1998 | Stringer et al. |
| 5,850,370 A | 12/1998 | Stringer et al. |
| 5,850,490 A | 12/1998 | Johnson |
| 5,869,827 A | 2/1999 | Rando |
| 5,870,220 A | 2/1999 | Migdal et al. |
| 5,900,611 A | 5/1999 | Hecht |
| 5,923,428 A | 7/1999 | Woodworth |
| 5,929,856 A | 7/1999 | LoNegro et al. |
| 5,938,710 A | 8/1999 | Lanza et al. |
| 5,959,568 A | 9/1999 | Woolley |
| 5,960,098 A | 9/1999 | Tao |
| 5,969,823 A | 10/1999 | Wurz et al. |
| 5,978,512 A | 11/1999 | Kim |
| 5,979,760 A | 11/1999 | Freyman et al. |
| 5,988,862 A | 11/1999 | Kacyra et al. |
| 5,991,041 A | 11/1999 | Woodworth |
| 6,009,189 A | 12/1999 | Schaack |
| 6,025,847 A | 2/2000 | Marks |
| 6,049,386 A | 4/2000 | Stringer et al. |
| 6,053,409 A | 4/2000 | Brobst et al. |
| 6,064,759 A | 5/2000 | Buckley et al. |
| 6,067,110 A | 5/2000 | Nonaka et al. |
| 6,069,696 A | 5/2000 | McQueen et al. |
| 6,115,114 A | 9/2000 | Berg et al. |
| 6,137,577 A | 10/2000 | Woodworth |
| 6,177,999 B1 | 1/2001 | Wurz et al. |
| 6,189,223 B1 | 2/2001 | Haug |
| 6,232,597 B1 | 5/2001 | Kley |
| 6,236,403 B1 | 5/2001 | Chaki |
| 6,246,468 B1 | 6/2001 | Dimsdale |
| 6,333,749 B1 | 12/2001 | Reinhardt et al. |
| 6,336,587 B1 | 1/2002 | He et al. |
| 6,369,401 B1 | 4/2002 | Lee |
| 6,373,579 B1 | 4/2002 | Ober et al. |
| 6,429,803 B1 | 8/2002 | Kumar |
| 6,457,642 B1 | 10/2002 | Good et al. |
| 6,507,406 B1 | 1/2003 | Yagi et al. |
| 6,517,004 B2 | 2/2003 | Good et al. |
| 6,519,550 B1 | 2/2003 | D'Hooge et al. |
| 6,674,904 B1 | 1/2004 | McQueen |
| 6,705,526 B1 | 3/2004 | Zhu et al. |
| 6,781,621 B1 | 8/2004 | Gobush et al. |
| 6,824,058 B2 | 11/2004 | Patel et al. |
| 6,832,725 B2 | 12/2004 | Gardiner et al. |
| 6,858,857 B2 | 2/2005 | Pease et al. |
| 6,922,632 B2 | 7/2005 | Foxlin |
| 6,971,580 B2 | 12/2005 | Zhu et al. |
| 6,995,762 B1 | 2/2006 | Pavlidis et al. |
| 7,057,632 B2 | 6/2006 | Yamawaki et al. |
| 7,085,409 B2 | 8/2006 | Sawhney et al. |
| 7,086,162 B2 | 8/2006 | Tyroler |
| 7,104,453 B1 | 9/2006 | Zhu et al. |
| 7,128,266 B2 | 10/2006 | Zhu et al. |
| 7,137,556 B1 | 11/2006 | Bonner et al. |
| 7,159,783 B2 | 1/2007 | Walczyk et al. |
| 7,161,688 B1 | 1/2007 | Bonner et al. |
| 7,205,529 B2 | 4/2007 | Andersen et al. |
| 7,214,954 B2 | 5/2007 | Schopp |
| 7,277,187 B2 | 10/2007 | Smith et al. |
| 7,307,653 B2 | 12/2007 | Dutta |
| 7,310,431 B2 | 12/2007 | Gokturk et al. |
| 7,413,127 B2 | 8/2008 | Ehrhart et al. |
| 7,527,205 B2 | 5/2009 | Zhu |
| 7,586,049 B2 | 9/2009 | Wurz |
| 7,602,404 B1 | 10/2009 | Reinhardt et al. |
| 7,639,722 B1 | 12/2009 | Paxton et al. |
| 7,726,575 B2 | 6/2010 | Wang et al. |
| 7,780,084 B2 | 8/2010 | Zhang et al. |
| 7,788,883 B2 | 9/2010 | Buckley et al. |
| 7,974,025 B2 | 7/2011 | Topliss |
| 8,027,096 B2 | 9/2011 | Feng et al. |
| 8,028,501 B2 | 10/2011 | Buckley et al. |
| 8,050,461 B2 | 11/2011 | Shpunt et al. |
| 8,055,061 B2 | 11/2011 | Katano |
| 8,072,581 B1 | 12/2011 | Breiholz |
| 8,102,395 B2 | 1/2012 | Kondo et al. |
| 8,132,728 B2 | 3/2012 | Dwinell et al. |
| 8,134,717 B2 | 3/2012 | Pangrazio et al. |
| 8,149,224 B1 | 4/2012 | Kuo et al. |
| 8,194,097 B2 | 6/2012 | Xiao et al. |
| 8,212,889 B2 | 7/2012 | Chanas et al. |
| 8,228,510 B2 | 7/2012 | Pangrazio et al. |
| 8,230,367 B2 | 7/2012 | Bell et al. |
| 8,294,969 B2 | 10/2012 | Plesko |
| 8,305,458 B2 | 11/2012 | Hara |
| 8,310,656 B2 | 11/2012 | Zalewski |
| 8,313,380 B2 | 11/2012 | Zalewski et al. |
| 8,317,105 B2 | 11/2012 | Kotlarsky et al. |
| 8,322,622 B2 | 12/2012 | Liu |
| 8,339,462 B2 | 12/2012 | Stec et al. |
| 8,350,959 B2 | 1/2013 | Topliss et al. |
| 8,351,670 B2 | 1/2013 | Ijiri et al. |
| 8,366,005 B2 | 2/2013 | Kotlarsky et al. |
| 8,371,507 B2 | 2/2013 | Haggerty et al. |
| 8,376,233 B2 | 2/2013 | Horn et al. |
| 8,381,976 B2 | 2/2013 | Mohideen et al. |
| 8,381,979 B2 | 2/2013 | Franz |
| 8,390,909 B2 | 3/2013 | Plesko |
| 8,408,464 B2 | 4/2013 | Zhu et al. |
| 8,408,468 B2 | 4/2013 | Horn et al. |
| 8,408,469 B2 | 4/2013 | Good |
| 8,424,768 B2 | 4/2013 | Rueblinger et al. |
| 8,437,539 B2 | 5/2013 | Komatsu et al. |
| 8,441,749 B2 | 5/2013 | Brown et al. |
| 8,448,863 B2 | 5/2013 | Xian et al. |
| 8,457,013 B2 | 6/2013 | Essinger et al. |
| 8,459,557 B2 | 6/2013 | Havens et al. |
| 8,463,079 B2 | 6/2013 | Ackley et al. |
| 8,469,272 B2 | 6/2013 | Kearney |
| 8,474,712 B2 | 7/2013 | Kearney et al. |
| 8,479,992 B2 | 7/2013 | Kotlarsky et al. |
| 8,490,877 B2 | 7/2013 | Kearney |
| 8,517,271 B2 | 8/2013 | Kotlarsky et al. |
| 8,523,076 B2 | 9/2013 | Good |
| 8,528,818 B2 | 9/2013 | Ehrhart et al. |
| 8,544,737 B2 | 10/2013 | Gomez et al. |
| 8,548,420 B2 | 10/2013 | Grunow et al. |
| 8,550,335 B2 | 10/2013 | Samek et al. |
| 8,550,354 B2 | 10/2013 | Gannon et al. |
| 8,550,357 B2 | 10/2013 | Kearney |
| 8,556,174 B2 | 10/2013 | Kosecki et al. |
| 8,556,176 B2 | 10/2013 | Van Horn et al. |
| 8,556,177 B2 | 10/2013 | Hussey et al. |
| 8,559,767 B2 | 10/2013 | Barber et al. |
| 8,561,895 B2 | 10/2013 | Gomez et al. |
| 8,561,903 B2 | 10/2013 | Sauerwein |
| 8,561,905 B2 | 10/2013 | Edmonds et al. |
| 8,565,107 B2 | 10/2013 | Pease et al. |
| 8,570,343 B2 | 10/2013 | Halstead |
| 8,571,307 B2 | 10/2013 | Li et al. |
| 8,576,390 B1 | 11/2013 | Nunnink |
| 8,579,200 B2 | 11/2013 | Samek et al. |
| 8,583,924 B2 | 11/2013 | Caballero et al. |
| 8,584,945 B2 | 11/2013 | Wang et al. |
| 8,587,595 B2 | 11/2013 | Wang |
| 8,587,697 B2 | 11/2013 | Hussey et al. |
| 8,588,869 B2 | 11/2013 | Sauerwein et al. |
| 8,590,789 B2 | 11/2013 | Nahill et al. |
| 8,596,539 B2 | 12/2013 | Havens et al. |
| 8,596,542 B2 | 12/2013 | Havens et al. |
| 8,596,543 B2 | 12/2013 | Havens et al. |
| 8,599,271 B2 | 12/2013 | Havens et al. |

(56) References Cited

U.S. PATENT DOCUMENTS

| | | |
|---|---|---|
| 8,599,957 B2 | 12/2013 | Peake et al. |
| 8,600,158 B2 | 12/2013 | Li et al. |
| 8,600,167 B2 | 12/2013 | Showering |
| 8,602,309 B2 | 12/2013 | Longacre et al. |
| 8,608,053 B2 | 12/2013 | Meier et al. |
| 8,608,071 B2 | 12/2013 | Liu et al. |
| 8,611,309 B2 | 12/2013 | Wang et al. |
| 8,615,487 B2 | 12/2013 | Gomez et al. |
| 8,621,123 B2 | 12/2013 | Caballero |
| 8,622,303 B2 | 1/2014 | Meier et al. |
| 8,628,013 B2 | 1/2014 | Ding |
| 8,628,015 B2 | 1/2014 | Wang et al. |
| 8,628,016 B2 | 1/2014 | Winegar |
| 8,629,926 B2 | 1/2014 | Wang |
| 8,630,491 B2 | 1/2014 | Longacre et al. |
| 8,635,309 B2 | 1/2014 | Berthiaume et al. |
| 8,636,200 B2 | 1/2014 | Kearney |
| 8,636,212 B2 | 1/2014 | Nahill et al. |
| 8,636,215 B2 | 1/2014 | Ding et al. |
| 8,636,224 B2 | 1/2014 | Wang |
| 8,638,806 B2 | 1/2014 | Wang et al. |
| 8,640,958 B2 | 2/2014 | Lu et al. |
| 8,640,960 B2 | 2/2014 | Wang et al. |
| 8,643,717 B2 | 2/2014 | Li et al. |
| 8,646,692 B2 | 2/2014 | Meier et al. |
| 8,646,694 B2 | 2/2014 | Wang et al. |
| 8,657,200 B2 | 2/2014 | Ren et al. |
| 8,659,397 B2 | 2/2014 | Vargo et al. |
| 8,668,149 B2 | 3/2014 | Good |
| 8,678,285 B2 | 3/2014 | Kearney |
| 8,678,286 B2 | 3/2014 | Smith et al. |
| 8,682,077 B1 | 3/2014 | Longacre |
| D702,237 S | 4/2014 | Oberpriller et al. |
| 8,687,282 B2 | 4/2014 | Feng et al. |
| 8,692,927 B2 | 4/2014 | Pease et al. |
| 8,695,880 B2 | 4/2014 | Bremer et al. |
| 8,698,949 B2 | 4/2014 | Grunow et al. |
| 8,702,000 B2 | 4/2014 | Barber et al. |
| 8,717,494 B2 | 5/2014 | Gannon |
| 8,720,783 B2 | 5/2014 | Biss et al. |
| 8,723,804 B2 | 5/2014 | Fletcher et al. |
| 8,723,904 B2 | 5/2014 | Marty et al. |
| 8,727,223 B2 | 5/2014 | Wang |
| 8,736,909 B2 | 5/2014 | Sato et al. |
| 8,740,082 B2 | 6/2014 | Wilz |
| 8,740,085 B2 | 6/2014 | Furlong et al. |
| 8,746,563 B2 | 6/2014 | Hennick et al. |
| 8,750,445 B2 | 6/2014 | Peake et al. |
| 8,752,766 B2 | 6/2014 | Xian et al. |
| 8,756,059 B2 | 6/2014 | Braho et al. |
| 8,757,495 B2 | 6/2014 | Qu et al. |
| 8,760,563 B2 | 6/2014 | Koziol et al. |
| 8,777,108 B2 | 7/2014 | Coyle |
| 8,777,109 B2 | 7/2014 | Oberpriller et al. |
| 8,779,898 B2 | 7/2014 | Havens et al. |
| 8,781,520 B2 | 7/2014 | Payne et al. |
| 8,783,573 B2 | 7/2014 | Havens et al. |
| 8,789,757 B2 | 7/2014 | Barten |
| 8,789,758 B2 | 7/2014 | Hawley et al. |
| 8,789,759 B2 | 7/2014 | Xian et al. |
| 8,792,688 B2 | 7/2014 | Unsworth |
| 8,794,520 B2 | 8/2014 | Wang et al. |
| 8,794,522 B2 | 8/2014 | Ehrhart |
| 8,794,525 B2 | 8/2014 | Amundsen et al. |
| 8,794,526 B2 | 8/2014 | Wang et al. |
| 8,798,367 B2 | 8/2014 | Ellis |
| 8,807,431 B2 | 8/2014 | Wang et al. |
| 8,807,432 B2 | 8/2014 | Van Horn et al. |
| 8,810,779 B1 | 8/2014 | Hilde |
| 8,820,630 B2 | 9/2014 | Qu et al. |
| 8,822,848 B2 | 9/2014 | Meagher |
| 8,824,692 B2 | 9/2014 | Sheerin et al. |
| 8,824,696 B2 | 9/2014 | Braho |
| 8,842,849 B2 | 9/2014 | Wahl et al. |
| 8,844,822 B2 | 9/2014 | Kotlarsky et al. |
| 8,844,823 B2 | 9/2014 | Fritz et al. |
| 8,849,019 B2 | 9/2014 | Li et al. |
| D716,285 S | 10/2014 | Chaney et al. |
| 8,851,383 B2 | 10/2014 | Yeakley et al. |
| 8,854,633 B2 | 10/2014 | Laffargue |
| 8,866,963 B2 | 10/2014 | Grunow et al. |
| 8,868,421 B2 | 10/2014 | Braho et al. |
| 8,868,519 B2 | 10/2014 | Maloy et al. |
| 8,868,802 B2 | 10/2014 | Barten |
| 8,868,803 B2 | 10/2014 | Caballero |
| 8,870,074 B1 | 10/2014 | Gannon |
| 8,879,639 B2 | 11/2014 | Sauerwein |
| 8,880,426 B2 | 11/2014 | Smith |
| 8,881,983 B2 | 11/2014 | Havens et al. |
| 8,881,987 B2 | 11/2014 | Wang |
| 8,897,596 B1 | 11/2014 | Passmore et al. |
| 8,903,172 B2 | 12/2014 | Smith |
| 8,908,995 B2 | 12/2014 | Benos et al. |
| 8,910,870 B2 | 12/2014 | Li et al. |
| 8,910,875 B2 | 12/2014 | Ren et al. |
| 8,914,290 B2 | 12/2014 | Hendrickson et al. |
| 8,914,788 B2 | 12/2014 | Pettinelli et al. |
| 8,915,439 B2 | 12/2014 | Feng et al. |
| 8,915,444 B2 | 12/2014 | Havens et al. |
| 8,916,789 B2 | 12/2014 | Woodburn |
| 8,918,250 B2 | 12/2014 | Hollifield |
| 8,918,564 B2 | 12/2014 | Caballero |
| 8,925,818 B2 | 1/2015 | Kosecki et al. |
| 8,939,374 B2 | 1/2015 | Jovanovski et al. |
| 8,942,480 B2 | 1/2015 | Ellis |
| 8,944,313 B2 | 2/2015 | Williams et al. |
| 8,944,327 B2 | 2/2015 | Meier et al. |
| 8,944,332 B2 | 2/2015 | Harding et al. |
| 8,950,678 B2 | 2/2015 | Germaine et al. |
| D723,560 S | 3/2015 | Zhou et al. |
| 8,967,468 B2 | 3/2015 | Gomez et al. |
| 8,971,346 B2 | 3/2015 | Sevier |
| 8,976,030 B2 | 3/2015 | Cunningham et al. |
| 8,976,368 B2 | 3/2015 | Akel et al. |
| 8,978,981 B2 | 3/2015 | Guan |
| 8,978,983 B2 | 3/2015 | Bremer et al. |
| 8,978,984 B2 | 3/2015 | Hennick et al. |
| 8,985,456 B2 | 3/2015 | Zhu et al. |
| 8,985,457 B2 | 3/2015 | Soule et al. |
| 8,985,459 B2 | 3/2015 | Kearney et al. |
| 8,985,461 B2 | 3/2015 | Gelay et al. |
| 8,988,578 B2 | 3/2015 | Showering |
| 8,988,590 B2 | 3/2015 | Gillet et al. |
| 8,991,704 B2 | 3/2015 | Hopper et al. |
| 8,996,194 B2 | 3/2015 | Davis et al. |
| 8,996,384 B2 | 3/2015 | Funyak et al. |
| 8,998,091 B2 | 4/2015 | Edmonds et al. |
| 9,002,641 B2 | 4/2015 | Showering |
| 9,007,368 B2 | 4/2015 | Laffargue et al. |
| 9,010,641 B2 | 4/2015 | Qu et al. |
| 9,014,441 B2 | 4/2015 | Truyen et al. |
| 9,015,513 B2 | 4/2015 | Murawski et al. |
| 9,016,576 B2 | 4/2015 | Brady et al. |
| D730,357 S | 5/2015 | Fitch et al. |
| 9,022,288 B2 | 5/2015 | Nahill et al. |
| 9,030,964 B2 | 5/2015 | Essinger et al. |
| 9,033,240 B2 | 5/2015 | Smith et al. |
| 9,033,242 B2 | 5/2015 | Gillet et al. |
| 9,036,054 B2 | 5/2015 | Koziol et al. |
| 9,037,344 B2 | 5/2015 | Chamberlin |
| 9,038,911 B2 | 5/2015 | Xian et al. |
| 9,038,915 B2 | 5/2015 | Smith |
| D730,901 S | 6/2015 | Oberpriller et al. |
| D730,902 S | 6/2015 | Fitch et al. |
| D733,112 S | 6/2015 | Chaney et al. |
| 9,047,098 B2 | 6/2015 | Barten |
| 9,047,359 B2 | 6/2015 | Caballero et al. |
| 9,047,420 B2 | 6/2015 | Caballero |
| 9,047,525 B2 | 6/2015 | Barber et al. |
| 9,047,531 B2 | 6/2015 | Showering et al. |
| 9,049,640 B2 | 6/2015 | Wang et al. |
| 9,053,055 B2 | 6/2015 | Caballero |
| 9,053,378 B1 | 6/2015 | Hou et al. |
| 9,053,380 B2 | 6/2015 | Xian et al. |

(56) References Cited

U.S. PATENT DOCUMENTS

| | | |
|---|---|---|
| 9,057,641 B2 | 6/2015 | Amundsen et al. |
| 9,058,526 B2 | 6/2015 | Powilleit |
| 9,064,165 B2 | 6/2015 | Havens et al. |
| 9,064,167 B2 | 6/2015 | Xian et al. |
| 9,064,168 B2 | 6/2015 | Todeschini et al. |
| 9,064,254 B2 | 6/2015 | Todeschini et al. |
| 9,066,032 B2 | 6/2015 | Wang |
| 9,070,032 B2 | 6/2015 | Corcoran |
| D734,339 S | 7/2015 | Zhou et al. |
| D734,751 S | 7/2015 | Oberpriller et al. |
| 9,082,023 B2 | 7/2015 | Feng et al. |
| 9,082,195 B2 | 7/2015 | Holeva et al. |
| 9,142,035 B1 | 9/2015 | Rotman et al. |
| 9,233,470 B1 | 1/2016 | Bradski et al. |
| 9,299,013 B1 | 3/2016 | Curlander et al. |
| 9,424,749 B1 | 8/2016 | Reed et al. |
| 9,464,885 B2 * | 10/2016 | Lloyd .................... G01B 11/24 |
| 9,486,921 B1 | 11/2016 | Straszheim et al. |
| 9,557,166 B2 * | 1/2017 | Thuries ................. G01B 11/24 |
| 2001/0027995 A1 | 10/2001 | Patel et al. |
| 2001/0032879 A1 | 10/2001 | He et al. |
| 2002/0054289 A1 | 5/2002 | Thibault et al. |
| 2002/0067855 A1 | 6/2002 | Chiu et al. |
| 2002/0109835 A1 | 8/2002 | Goetz |
| 2002/0118874 A1 | 8/2002 | Chung et al. |
| 2002/0158873 A1 | 10/2002 | Williamson |
| 2002/0167677 A1 | 11/2002 | Okada et al. |
| 2002/0179708 A1 | 12/2002 | Zhu et al. |
| 2002/0196534 A1 | 12/2002 | Lizotte et al. |
| 2003/0038179 A1 | 2/2003 | Tsikos et al. |
| 2003/0053513 A1 | 3/2003 | Vatan et al. |
| 2003/0063086 A1 | 4/2003 | Baumberg |
| 2003/0091227 A1 | 5/2003 | Chang et al. |
| 2003/0156756 A1 | 8/2003 | Gokturk et al. |
| 2003/0197138 A1 | 10/2003 | Pease et al. |
| 2003/0225712 A1 | 12/2003 | Cooper et al. |
| 2003/0235331 A1 | 12/2003 | Kawaike et al. |
| 2004/0008259 A1 | 1/2004 | Gokturk et al. |
| 2004/0019274 A1 | 1/2004 | Galloway et al. |
| 2004/0024754 A1 | 2/2004 | Mane et al. |
| 2004/0066329 A1 | 4/2004 | Zeitfuss et al. |
| 2004/0073359 A1 | 4/2004 | Ichijo et al. |
| 2004/0083025 A1 | 4/2004 | Yamanouchi et al. |
| 2004/0089482 A1 | 5/2004 | Ramsden et al. |
| 2004/0098146 A1 | 5/2004 | Katae et al. |
| 2004/0105580 A1 | 6/2004 | Hager et al. |
| 2004/0118928 A1 | 6/2004 | Patel et al. |
| 2004/0122779 A1 | 6/2004 | Stickler et al. |
| 2004/0155975 A1 | 8/2004 | Hart et al. |
| 2004/0165090 A1 | 8/2004 | Ning |
| 2004/0184041 A1 | 9/2004 | Schopp |
| 2004/0211836 A1 | 10/2004 | Patel et al. |
| 2004/0214623 A1 | 10/2004 | Takahashi et al. |
| 2004/0233461 A1 | 11/2004 | Armstrong et al. |
| 2004/0258353 A1 | 12/2004 | Gluckstad et al. |
| 2005/0006477 A1 | 1/2005 | Patel |
| 2005/0117215 A1 | 6/2005 | Lange |
| 2005/0128193 A1 | 6/2005 | Lueder |
| 2005/0128196 A1 | 6/2005 | Popescu et al. |
| 2005/0168488 A1 | 8/2005 | Montague |
| 2005/0211782 A1 | 9/2005 | Martin |
| 2005/0264867 A1 | 12/2005 | Cho et al. |
| 2006/0047704 A1 | 3/2006 | Gopalakrishnan |
| 2006/0078226 A1 | 4/2006 | Zhou |
| 2006/0108266 A1 | 5/2006 | Bowers et al. |
| 2006/0112023 A1 | 5/2006 | Horhann |
| 2006/0151604 A1 | 7/2006 | Zhu et al. |
| 2006/0159307 A1 | 7/2006 | Anderson et al. |
| 2006/0159344 A1 | 7/2006 | Shao et al. |
| 2006/0232681 A1 | 10/2006 | Okada |
| 2006/0255150 A1 | 11/2006 | Longacre |
| 2006/0269165 A1 | 11/2006 | Viswanathan |
| 2006/0291719 A1 | 12/2006 | Ikeda et al. |
| 2007/0003154 A1 | 1/2007 | Sun et al. |
| 2007/0025612 A1 | 2/2007 | Iwasaki et al. |
| 2007/0031064 A1 | 2/2007 | Zhao et al. |
| 2007/0063048 A1 | 3/2007 | Havens et al. |
| 2007/0116357 A1 | 5/2007 | Dewaele |
| 2007/0127022 A1 | 6/2007 | Cohen et al. |
| 2007/0143082 A1 | 6/2007 | Degnan |
| 2007/0153293 A1 | 7/2007 | Gruhlke et al. |
| 2007/0171220 A1 | 7/2007 | Kriveshko |
| 2007/0177011 A1 | 8/2007 | Lewin et al. |
| 2007/0181685 A1 | 8/2007 | Zhu et al. |
| 2007/0237356 A1 | 10/2007 | Dwinell et al. |
| 2007/0291031 A1 | 12/2007 | Konev et al. |
| 2007/0299338 A1 | 12/2007 | Stevick et al. |
| 2008/0013793 A1 | 1/2008 | Hillis et al. |
| 2008/0035390 A1 | 2/2008 | Wurz |
| 2008/0056536 A1 | 3/2008 | Hildreth et al. |
| 2008/0062164 A1 | 3/2008 | Bassi et al. |
| 2008/0077265 A1 | 3/2008 | Boyden |
| 2008/0079955 A1 | 4/2008 | Storm |
| 2008/0164074 A1 | 7/2008 | Wurz |
| 2008/0204476 A1 | 8/2008 | Montague |
| 2008/0212168 A1 | 9/2008 | Olmstead et al. |
| 2008/0247635 A1 | 10/2008 | Davis et al. |
| 2008/0273191 A1 | 11/2008 | Kim et al. |
| 2008/0273210 A1 * | 11/2008 | Hilde .................... G01S 7/4802 |
| | | 356/601 |
| 2008/0278790 A1 | 11/2008 | Boesser et al. |
| 2009/0059004 A1 | 3/2009 | Bochicchio |
| 2009/0095047 A1 | 4/2009 | Patel et al. |
| 2009/0134221 A1 | 5/2009 | Zhu et al. |
| 2009/0195790 A1 | 8/2009 | Zhu et al. |
| 2009/0225333 A1 | 9/2009 | Bendall et al. |
| 2009/0237411 A1 | 9/2009 | Gossweiler et al. |
| 2009/0268023 A1 | 10/2009 | Hsieh |
| 2009/0272724 A1 | 11/2009 | Gubler |
| 2009/0273770 A1 | 11/2009 | Bauhahn et al. |
| 2009/0313948 A1 | 12/2009 | Buckley et al. |
| 2009/0318815 A1 | 12/2009 | Barnes et al. |
| 2009/0323084 A1 | 12/2009 | Dunn et al. |
| 2009/0323121 A1 | 12/2009 | Valkenburg |
| 2010/0035637 A1 | 2/2010 | Varanasi et al. |
| 2010/0060604 A1 | 3/2010 | Zwart et al. |
| 2010/0091104 A1 | 4/2010 | Sprigle |
| 2010/0113153 A1 | 5/2010 | Yen et al. |
| 2010/0118200 A1 | 5/2010 | Gelman et al. |
| 2010/0128109 A1 | 5/2010 | Banks |
| 2010/0161170 A1 | 6/2010 | Siris |
| 2010/0171740 A1 | 7/2010 | Andersen et al. |
| 2010/0172567 A1 | 7/2010 | Prokoski |
| 2010/0177076 A1 | 7/2010 | Essinger et al. |
| 2010/0177080 A1 | 7/2010 | Essinger et al. |
| 2010/0177707 A1 | 7/2010 | Essinger et al. |
| 2010/0177749 A1 | 7/2010 | Essinger et al. |
| 2010/0202702 A1 | 8/2010 | Benos et al. |
| 2010/0208039 A1 | 8/2010 | Stettner |
| 2010/0211355 A1 | 8/2010 | Horst et al. |
| 2010/0217678 A1 | 8/2010 | Goncalves |
| 2010/0220849 A1 | 9/2010 | Colbert et al. |
| 2010/0220894 A1 | 9/2010 | Ackley et al. |
| 2010/0223276 A1 | 9/2010 | Al-Shameri et al. |
| 2010/0245850 A1 | 9/2010 | Lee et al. |
| 2010/0254611 A1 | 10/2010 | Arnz |
| 2010/0303336 A1 | 12/2010 | Abraham |
| 2010/0315413 A1 | 12/2010 | Izadi et al. |
| 2010/0321482 A1 | 12/2010 | Cleveland |
| 2011/0019155 A1 | 1/2011 | Daniel et al. |
| 2011/0040192 A1 | 2/2011 | Brenner et al. |
| 2011/0043609 A1 | 2/2011 | Choi et al. |
| 2011/0099474 A1 | 4/2011 | Grossman et al. |
| 2011/0169999 A1 | 7/2011 | Grunow et al. |
| 2011/0188054 A1 | 8/2011 | Petronius et al. |
| 2011/0188741 A1 | 8/2011 | Sones et al. |
| 2011/0202554 A1 | 8/2011 | Powilleit et al. |
| 2011/0234389 A1 | 9/2011 | Mellin |
| 2011/0235854 A1 | 9/2011 | Berger et al. |
| 2011/0249864 A1 | 10/2011 | Venkatesan et al. |
| 2011/0254840 A1 | 10/2011 | Halstead |
| 2011/0279916 A1 | 11/2011 | Brown et al. |
| 2011/0286007 A1 | 11/2011 | Pangrazio et al. |
| 2011/0286628 A1 | 11/2011 | Goncalves et al. |

(56) References Cited

U.S. PATENT DOCUMENTS

| | | |
|---|---|---|
| 2011/0288818 A1 | 11/2011 | Thierman |
| 2011/0301994 A1 | 12/2011 | Tieman |
| 2011/0303748 A1 | 12/2011 | Lemma et al. |
| 2011/0310227 A1 | 12/2011 | Konertz et al. |
| 2012/0024952 A1 | 2/2012 | Chen |
| 2012/0056982 A1 | 3/2012 | Katz et al. |
| 2012/0057345 A1 | 3/2012 | Kuchibhotla |
| 2012/0067955 A1 | 3/2012 | Rowe |
| 2012/0074227 A1 | 3/2012 | Ferren et al. |
| 2012/0081714 A1 | 4/2012 | Pangrazio et al. |
| 2012/0111946 A1 | 5/2012 | Golant |
| 2012/0113223 A1 | 5/2012 | Hilliges et al. |
| 2012/0113250 A1 | 5/2012 | Farlotti et al. |
| 2012/0126000 A1 | 5/2012 | Kunzig et al. |
| 2012/0140300 A1 | 6/2012 | Freeman |
| 2012/0168512 A1 | 7/2012 | Kotlarsky et al. |
| 2012/0179665 A1 | 7/2012 | Baarman et al. |
| 2012/0185094 A1 | 7/2012 | Rosenstein et al. |
| 2012/0190386 A1 | 7/2012 | Anderson |
| 2012/0193423 A1 | 8/2012 | Samek |
| 2012/0197464 A1 | 8/2012 | Wang et al. |
| 2012/0203647 A1 | 8/2012 | Smith |
| 2012/0218436 A1 | 8/2012 | Rodriguez et al. |
| 2012/0223141 A1 | 9/2012 | Good et al. |
| 2012/0224026 A1 | 9/2012 | Bayer et al. |
| 2012/0236288 A1 | 9/2012 | Stanley |
| 2012/0242852 A1 | 9/2012 | Hayward et al. |
| 2012/0256901 A1 | 10/2012 | Bendall |
| 2012/0262558 A1 | 10/2012 | Boger et al. |
| 2012/0280908 A1 | 11/2012 | Rhoads et al. |
| 2012/0282905 A1 | 11/2012 | Owen |
| 2012/0282911 A1 | 11/2012 | Davis et al. |
| 2012/0284012 A1 | 11/2012 | Rodriguez et al. |
| 2012/0284122 A1 | 11/2012 | Brandis |
| 2012/0284339 A1 | 11/2012 | Rodriguez |
| 2012/0284593 A1 | 11/2012 | Rodriguez |
| 2012/0293610 A1 | 11/2012 | Doepke et al. |
| 2012/0294549 A1 | 11/2012 | Doepke |
| 2012/0299961 A1 | 11/2012 | Ramkumar et al. |
| 2012/0300991 A1 | 11/2012 | Free |
| 2012/0313848 A1 | 12/2012 | Galor et al. |
| 2012/0314030 A1 | 12/2012 | Datta |
| 2012/0314058 A1 | 12/2012 | Bendall et al. |
| 2012/0316820 A1 | 12/2012 | Nakazato et al. |
| 2013/0019278 A1 | 1/2013 | Sun et al. |
| 2013/0038881 A1 | 2/2013 | Pesach et al. |
| 2013/0038941 A1 | 2/2013 | Pesach et al. |
| 2013/0043312 A1 | 2/2013 | Van Horn |
| 2013/0050426 A1 | 2/2013 | Sarmast et al. |
| 2013/0075168 A1 | 3/2013 | Amundsen et al. |
| 2013/0094069 A1 | 4/2013 | Lee et al. |
| 2013/0101158 A1 | 4/2013 | Lloyd et al. |
| 2013/0156267 A1 | 6/2013 | Muraoka et al. |
| 2013/0175341 A1 | 7/2013 | Kearney et al. |
| 2013/0175343 A1 | 7/2013 | Good |
| 2013/0200150 A1 | 8/2013 | Reynolds et al. |
| 2013/0201288 A1 | 8/2013 | Billerbeck et al. |
| 2013/0208164 A1 | 8/2013 | Cazier et al. |
| 2013/0211790 A1 | 8/2013 | Loveland et al. |
| 2013/0223673 A1 | 8/2013 | Davis et al. |
| 2013/0257744 A1 | 10/2013 | Daghigh et al. |
| 2013/0257759 A1 | 10/2013 | Daghigh |
| 2013/0270346 A1 | 10/2013 | Xian et al. |
| 2013/0287258 A1 | 10/2013 | Kearney |
| 2013/0291998 A1 | 11/2013 | Konnerth |
| 2013/0292475 A1 | 11/2013 | Kotlarsky et al. |
| 2013/0292477 A1 | 11/2013 | Hennick et al. |
| 2013/0293539 A1 | 11/2013 | Hunt et al. |
| 2013/0293540 A1 | 11/2013 | Laffargue et al. |
| 2013/0306728 A1 | 11/2013 | Thuries et al. |
| 2013/0306731 A1 | 11/2013 | Pedraro |
| 2013/0307964 A1 | 11/2013 | Bremer et al. |
| 2013/0308013 A1 | 11/2013 | Li et al. |
| 2013/0308625 A1 | 11/2013 | Park et al. |
| 2013/0313324 A1 | 11/2013 | Koziol et al. |
| 2013/0313325 A1 | 11/2013 | Wilz et al. |
| 2013/0329012 A1* | 12/2013 | Bartos ............... H04N 13/0246 348/46 |
| 2013/0329013 A1 | 12/2013 | Metois et al. |
| 2013/0342342 A1 | 12/2013 | Sabre et al. |
| 2013/0342717 A1 | 12/2013 | Havens et al. |
| 2014/0001267 A1 | 1/2014 | Giordano et al. |
| 2014/0002828 A1 | 1/2014 | Laffargue et al. |
| 2014/0008439 A1 | 1/2014 | Wang |
| 2014/0009586 A1 | 1/2014 | McNamer et al. |
| 2014/0021259 A1 | 1/2014 | Moed et al. |
| 2014/0025584 A1 | 1/2014 | Liu et al. |
| 2014/0031665 A1 | 1/2014 | Pinto et al. |
| 2014/0034731 A1 | 2/2014 | Gao et al. |
| 2014/0034734 A1 | 2/2014 | Sauerwein |
| 2014/0036848 A1 | 2/2014 | Pease et al. |
| 2014/0039693 A1 | 2/2014 | Havens et al. |
| 2014/0042814 A1 | 2/2014 | Kather et al. |
| 2014/0049120 A1 | 2/2014 | Kohtz et al. |
| 2014/0049635 A1* | 2/2014 | Laffargue ............ G01F 25/0084 348/135 |
| 2014/0058612 A1 | 2/2014 | Wong et al. |
| 2014/0061306 A1 | 3/2014 | Wu et al. |
| 2014/0062709 A1 | 3/2014 | Hyer et al. |
| 2014/0063289 A1 | 3/2014 | Hussey et al. |
| 2014/0066136 A1 | 3/2014 | Sauerwein et al. |
| 2014/0067104 A1 | 3/2014 | Osterhout |
| 2014/0067692 A1 | 3/2014 | Ye et al. |
| 2014/0070005 A1 | 3/2014 | Nahill et al. |
| 2014/0071430 A1 | 3/2014 | Hansen et al. |
| 2014/0071840 A1 | 3/2014 | Venancio |
| 2014/0074746 A1 | 3/2014 | Wang |
| 2014/0076974 A1 | 3/2014 | Havens et al. |
| 2014/0078341 A1 | 3/2014 | Havens et al. |
| 2014/0078342 A1 | 3/2014 | Li et al. |
| 2014/0078345 A1 | 3/2014 | Showering |
| 2014/0079297 A1 | 3/2014 | Tadayon et al. |
| 2014/0091147 A1 | 4/2014 | Evans et al. |
| 2014/0097238 A1 | 4/2014 | Ghazizadeh |
| 2014/0098091 A1 | 4/2014 | Hori |
| 2014/0098792 A1 | 4/2014 | Wang et al. |
| 2014/0100774 A1 | 4/2014 | Showering |
| 2014/0100813 A1 | 4/2014 | Showering |
| 2014/0103115 A1 | 4/2014 | Meier et al. |
| 2014/0104413 A1 | 4/2014 | McCloskey et al. |
| 2014/0104414 A1 | 4/2014 | McCloskey et al. |
| 2014/0104416 A1 | 4/2014 | Giordano et al. |
| 2014/0104451 A1 | 4/2014 | Todeschini et al. |
| 2014/0104664 A1 | 4/2014 | Lee |
| 2014/0106594 A1 | 4/2014 | Skvoretz |
| 2014/0106725 A1 | 4/2014 | Sauerwein |
| 2014/0108010 A1 | 4/2014 | Maltseff et al. |
| 2014/0108402 A1 | 4/2014 | Gomez et al. |
| 2014/0108682 A1 | 4/2014 | Caballero |
| 2014/0110485 A1 | 4/2014 | Toa et al. |
| 2014/0114530 A1 | 4/2014 | Fitch et al. |
| 2014/0124577 A1 | 5/2014 | Wang et al. |
| 2014/0124579 A1 | 5/2014 | Ding |
| 2014/0125842 A1 | 5/2014 | Winegar |
| 2014/0125853 A1 | 5/2014 | Wang |
| 2014/0125999 A1 | 5/2014 | Longacre et al. |
| 2014/0129378 A1 | 5/2014 | Richardson |
| 2014/0131438 A1 | 5/2014 | Kearney |
| 2014/0131441 A1 | 5/2014 | Nahill et al. |
| 2014/0131443 A1 | 5/2014 | Smith |
| 2014/0131444 A1 | 5/2014 | Wang |
| 2014/0131445 A1 | 5/2014 | Ding et al. |
| 2014/0131448 A1 | 5/2014 | Xian et al. |
| 2014/0133379 A1 | 5/2014 | Wang et al. |
| 2014/0135984 A1 | 5/2014 | Hirata |
| 2014/0136208 A1 | 5/2014 | Maltseff et al. |
| 2014/0139654 A1 | 5/2014 | Takahashi |
| 2014/0140585 A1 | 5/2014 | Wang |
| 2014/0142398 A1 | 5/2014 | Patil et al. |
| 2014/0151453 A1 | 6/2014 | Meier et al. |
| 2014/0152882 A1 | 6/2014 | Samek et al. |
| 2014/0152975 A1 | 6/2014 | Ko |
| 2014/0158468 A1 | 6/2014 | Adami |
| 2014/0158770 A1 | 6/2014 | Sevier et al. |

(56) References Cited

U.S. PATENT DOCUMENTS

| | | |
|---|---|---|
| 2014/0159869 A1 | 6/2014 | Zumsteg et al. |
| 2014/0166755 A1 | 6/2014 | Liu et al. |
| 2014/0166757 A1 | 6/2014 | Smith |
| 2014/0166759 A1 | 6/2014 | Liu et al. |
| 2014/0168380 A1 | 6/2014 | Heidemann et al. |
| 2014/0168787 A1 | 6/2014 | Wang et al. |
| 2014/0175165 A1 | 6/2014 | Havens et al. |
| 2014/0175172 A1 | 6/2014 | Jovanovski et al. |
| 2014/0191644 A1 | 7/2014 | Chaney |
| 2014/0191913 A1 | 7/2014 | Ge et al. |
| 2014/0192187 A1 | 7/2014 | Atwell et al. |
| 2014/0192551 A1 | 7/2014 | Masaki |
| 2014/0197238 A1 | 7/2014 | Lui et al. |
| 2014/0197239 A1 | 7/2014 | Havens et al. |
| 2014/0197304 A1 | 7/2014 | Feng et al. |
| 2014/0201126 A1 | 7/2014 | Zadeh et al. |
| 2014/0203087 A1 | 7/2014 | Smith et al. |
| 2014/0204268 A1 | 7/2014 | Grunow et al. |
| 2014/0205150 A1 | 7/2014 | Ogawa |
| 2014/0214631 A1 | 7/2014 | Hansen |
| 2014/0217166 A1 | 8/2014 | Berthiaume et al. |
| 2014/0217180 A1 | 8/2014 | Liu |
| 2014/0225918 A1 | 8/2014 | Mittal et al. |
| 2014/0225985 A1 | 8/2014 | Klusza et al. |
| 2014/0231500 A1 | 8/2014 | Ehrhart et al. |
| 2014/0232930 A1 | 8/2014 | Anderson |
| 2014/0240454 A1 | 8/2014 | Hirata et al. |
| 2014/0247279 A1 | 9/2014 | Nicholas et al. |
| 2014/0247280 A1 | 9/2014 | Nicholas et al. |
| 2014/0247315 A1 | 9/2014 | Marty et al. |
| 2014/0263493 A1 | 9/2014 | Amurgis et al. |
| 2014/0263645 A1 | 9/2014 | Smith et al. |
| 2014/0267609 A1 | 9/2014 | Laffargue |
| 2014/0268093 A1 | 9/2014 | Tohme et al. |
| 2014/0270196 A1 | 9/2014 | Braho et al. |
| 2014/0270229 A1 | 9/2014 | Braho |
| 2014/0270361 A1 | 9/2014 | Amma et al. |
| 2014/0278387 A1 | 9/2014 | DiGregorio |
| 2014/0282210 A1 | 9/2014 | Bianconi |
| 2014/0284384 A1 | 9/2014 | Lu et al. |
| 2014/0288933 A1 | 9/2014 | Braho et al. |
| 2014/0297058 A1 | 10/2014 | Barker et al. |
| 2014/0299665 A1 | 10/2014 | Barber et al. |
| 2014/0306833 A1 | 10/2014 | Ricci |
| 2014/0307855 A1 | 10/2014 | Withagen et al. |
| 2014/0312121 A1 | 10/2014 | Lu et al. |
| 2014/0313527 A1 | 10/2014 | Askan |
| 2014/0319219 A1 | 10/2014 | Liu et al. |
| 2014/0319220 A1 | 10/2014 | Coyle |
| 2014/0319221 A1 | 10/2014 | Oberpriller et al. |
| 2014/0320408 A1 | 10/2014 | Zagorsek et al. |
| 2014/0326787 A1 | 11/2014 | Barten |
| 2014/0332590 A1 | 11/2014 | Wang et al. |
| 2014/0344943 A1 | 11/2014 | Todeschini et al. |
| 2014/0346233 A1 | 11/2014 | Liu et al. |
| 2014/0347553 A1 | 11/2014 | Ovsiannikov et al. |
| 2014/0350710 A1 | 11/2014 | Gopalakrishnan et al. |
| 2014/0351317 A1 | 11/2014 | Smith et al. |
| 2014/0353373 A1 | 12/2014 | Van Horn et al. |
| 2014/0361073 A1 | 12/2014 | Qu et al. |
| 2014/0361082 A1 | 12/2014 | Xian et al. |
| 2014/0362184 A1 | 12/2014 | Jovanovski et al. |
| 2014/0363015 A1 | 12/2014 | Braho |
| 2014/0369511 A1 | 12/2014 | Sheerin et al. |
| 2014/0374483 A1 | 12/2014 | Lu |
| 2014/0374485 A1 | 12/2014 | Xian et al. |
| 2014/0379613 A1 | 12/2014 | Nishitani et al. |
| 2015/0001301 A1 | 1/2015 | Ouyang |
| 2015/0001304 A1 | 1/2015 | Todeschini |
| 2015/0003673 A1 | 1/2015 | Fletcher |
| 2015/0009100 A1 | 1/2015 | Haneda et al. |
| 2015/0009301 A1 | 1/2015 | Ribnick et al. |
| 2015/0009338 A1 | 1/2015 | Laffargue et al. |
| 2015/0009610 A1 | 1/2015 | London et al. |
| 2015/0014416 A1 | 1/2015 | Kotlarsky et al. |
| 2015/0021397 A1 | 1/2015 | Rueblinger et al. |
| 2015/0028102 A1 | 1/2015 | Ren et al. |
| 2015/0028103 A1 | 1/2015 | Jiang |
| 2015/0028104 A1 | 1/2015 | Ma et al. |
| 2015/0029002 A1 | 1/2015 | Yeakley et al. |
| 2015/0032709 A1 | 1/2015 | Maloy et al. |
| 2015/0036876 A1 | 2/2015 | Marrion et al. |
| 2015/0039309 A1 | 2/2015 | Braho et al. |
| 2015/0040378 A1 | 2/2015 | Saber et al. |
| 2015/0048168 A1 | 2/2015 | Fritz et al. |
| 2015/0049347 A1 | 2/2015 | Laffargue et al. |
| 2015/0051992 A1 | 2/2015 | Smith |
| 2015/0053766 A1 | 2/2015 | Havens et al. |
| 2015/0053768 A1 | 2/2015 | Wang et al. |
| 2015/0053769 A1 | 2/2015 | Thuries et al. |
| 2015/0062366 A1 | 3/2015 | Liu et al. |
| 2015/0062369 A1 | 3/2015 | Gehring et al. |
| 2015/0063215 A1 | 3/2015 | Wang |
| 2015/0063676 A1 | 3/2015 | Lloyd et al. |
| 2015/0069130 A1 | 3/2015 | Gannon |
| 2015/0071818 A1 | 3/2015 | Scheuren et al. |
| 2015/0083800 A1 | 3/2015 | Li et al. |
| 2015/0086114 A1 | 3/2015 | Todeschini |
| 2015/0088522 A1 | 3/2015 | Hendrickson et al. |
| 2015/0096872 A1 | 4/2015 | Woodburn |
| 2015/0099557 A1 | 4/2015 | Pettinelli et al. |
| 2015/0100196 A1 | 4/2015 | Hollifield |
| 2015/0102109 A1 | 4/2015 | Huck |
| 2015/0115035 A1 | 4/2015 | Meier et al. |
| 2015/0116498 A1 | 4/2015 | Vartiainen et al. |
| 2015/0127791 A1 | 5/2015 | Kosecki et al. |
| 2015/0128116 A1 | 5/2015 | Chen et al. |
| 2015/0129659 A1 | 5/2015 | Feng et al. |
| 2015/0133047 A1 | 5/2015 | Smith et al. |
| 2015/0134470 A1 | 5/2015 | Hejl et al. |
| 2015/0136851 A1 | 5/2015 | Harding et al. |
| 2015/0136854 A1 | 5/2015 | Lu et al. |
| 2015/0142492 A1 | 5/2015 | Kumar |
| 2015/0144692 A1 | 5/2015 | Hejl |
| 2015/0144698 A1 | 5/2015 | Teng et al. |
| 2015/0144701 A1 | 5/2015 | Xian et al. |
| 2015/0149946 A1 | 5/2015 | Benos et al. |
| 2015/0161429 A1 | 6/2015 | Xian |
| 2015/0163474 A1 | 6/2015 | You |
| 2015/0169925 A1 | 6/2015 | Chen et al. |
| 2015/0169929 A1 | 6/2015 | Williams et al. |
| 2015/0178900 A1 | 6/2015 | Kim et al. |
| 2015/0186703 A1 | 7/2015 | Chen et al. |
| 2015/0193644 A1 | 7/2015 | Kearney et al. |
| 2015/0193645 A1 | 7/2015 | Colavito et al. |
| 2015/0199957 A1 | 7/2015 | Funyak et al. |
| 2015/0204662 A1 | 7/2015 | Kobayashi et al. |
| 2015/0204671 A1 | 7/2015 | Showering |
| 2015/0213647 A1 | 7/2015 | Laffargue et al. |
| 2015/0229838 A1 | 8/2015 | Hakim et al. |
| 2015/0269403 A1 | 9/2015 | Lei et al. |
| 2015/0276379 A1 | 10/2015 | Ni et al. |
| 2015/0301181 A1 | 10/2015 | Herschbach |
| 2015/0308816 A1 | 10/2015 | Laffargue et al. |
| 2015/0325036 A1 | 11/2015 | Lee |
| 2015/0355470 A1 | 12/2015 | Herschbach |
| 2016/0048725 A1 | 2/2016 | Holz et al. |
| 2016/0063429 A1 | 3/2016 | Varley et al. |
| 2016/0090283 A1 | 3/2016 | Svensson et al. |
| 2016/0090284 A1 | 3/2016 | Svensson et al. |
| 2016/0138247 A1 | 5/2016 | Conway et al. |
| 2016/0138248 A1 | 5/2016 | Conway et al. |
| 2016/0138249 A1 | 5/2016 | Conway et al. |
| 2016/0169665 A1 | 6/2016 | Deschenes et al. |
| 2016/0187186 A1 | 6/2016 | Coleman et al. |
| 2016/0187210 A1 | 6/2016 | Coleman et al. |
| 2016/0191801 A1 | 6/2016 | Sivan |
| 2016/0202478 A1 | 7/2016 | Masson et al. |

(56) References Cited

U.S. PATENT DOCUMENTS

| | | | |
|---|---|---|---|
| 2017/0115490 | A1 | 4/2017 | Hsieh et al. |
| 2017/0182942 | A1 | 6/2017 | Hardy et al. |

FOREIGN PATENT DOCUMENTS

| | | | |
|---|---|---|---|
| DE | 3335760 A1 | 4/1985 | |
| DE | 10210813 A1 | 10/2003 | |
| DE | 102007037282 A1 | 3/2008 | |
| EP | 1111435 A2 | 6/2001 | |
| EP | 1443312 A1 | 8/2004 | |
| EP | 2013117 A1 | 1/2009 | |
| EP | 2286932 A2 | 2/2011 | |
| EP | 2381421 A2 | 10/2011 | |
| EP | 2533009 A2 | 12/2012 | |
| EP | 2562715 A1 | 2/2013 | |
| EP | 2722656 A1 | 4/2014 | |
| EP | 2779027 A1 | 9/2014 | |
| EP | 2833323 A2 | 2/2015 | |
| EP | 2843590 A1 | 3/2015 | |
| EP | 2845170 A1 | 3/2015 | |
| EP | 2966595 A1 | 1/2016 | |
| EP | 3006893 A1 | 3/2016 | |
| EP | 3012601 A1 | 3/2016 | |
| EP | 3007096 A1 | 4/2016 | |
| GB | 2503978 A | 1/2014 | |
| GB | 2525053 A | 10/2015 | |
| GB | 2531928 A | 5/2016 | |
| JP | H04129902 A | 4/1992 | |
| JP | 200696457 A | 4/2006 | |
| JP | 2007084162 A | 4/2007 | |
| JP | 2008210276 A | 9/2008 | |
| JP | 2014210646 A | 11/2014 | |
| JP | 2015174705 A | 10/2015 | |
| KR | 20100020115 A | 2/2010 | |
| KR | 20110013200 A | 2/2011 | |
| KR | 20110117020 A | 10/2011 | |
| KR | 20120028109 A | 3/2012 | |
| WO | 96/40452 A1 | 12/1996 | |
| WO | 0077726 A1 | 12/2000 | |
| WO | 0114836 A1 | 3/2001 | |
| WO | 2006095110 A1 | 9/2006 | |
| WO | 2007015059 A1 | 2/2007 | |
| WO | 200712554 A1 | 11/2007 | |
| WO | 2011017241 A1 | 2/2011 | |
| WO | 2012175731 A1 | 12/2012 | |
| WO | 2013021157 A1 | 2/2013 | |
| WO | 2013033442 A1 | 3/2013 | |
| WO | 2013163789 A1 | 11/2013 | |
| WO | 2013166368 A1 | 11/2013 | |
| WO | 2013173985 A1 | 11/2013 | |
| WO | 2013184340 A1 | 12/2013 | |
| WO | 2014019130 A1 | 2/2014 | |
| WO | 2014102341 A1 | 7/2014 | |
| WO | 2014110495 A1 | 7/2014 | |
| WO | 2014149702 A1 | 9/2014 | |
| WO | 2014151746 A2 | 9/2014 | |
| WO | 2015006865 A1 | 1/2015 | |
| WO | 2016020038 A1 | 2/2016 | |
| WO | 2016061699 A1 | 4/2016 | |

OTHER PUBLICATIONS

U.S. Appl. No. 14/519,249, H. Sprague Ackley et al., filed Oct. 21, 2014, not published yet. 36 pages.

U.S. Appl. No. 14/519,233, Franck Laffargue et al., filed Oct. 21, 2014, not published yet. 34 pages.

U.S. Appl. No. 14/519,211, H. Sprague Ackley et al., filed Oct. 21, 2014, not published yet. 33 pages.

U.S. Appl. No. 14/519,195, Franck Laffargue et al., filed Oct. 21, 2014, not published yet. 35 pages.

Peter Clarke, Actuator Developer Claims Anti-Shake Breakthrough for Smartphone Cams, Electronic Engineering Times, p. 24, May 16, 2011.

U.S. Appl. No. 14/055,234, not yet published, Hand Held Products, Inc., filed Oct. 16, 2013; 26 pages.

U.S. Appl. No. 13/912,262, not yet published, filed Jun. 7, 2013, Hand Held Products Inc., Method of Error Correction for 3D Imaging Device: 33 pages.

European Search Report for application No. EP13186043 (now EP2722656 (dated Apr. 23, 2014)): Total pp. 7.

International Search Report for PCT/US2013/039438, dated Oct. 1, 2013, 7 pages.

U.S. Appl. No. 14/453,019, not yet published, filed Aug. 6, 2014, Hand Held Products Inc., Dimensioning System With Guided Alignment: 31 pages.

European Office Action for application EP 13186043, dated Jun. 12, 2014(now EP2722656 (dated Apr. 23, 2014)), Total of 6 pages.

U.S. Appl. No. 14/461,524, not yet published, filed Aug. 18, 2014, Hand Held Products Inc., System and Method for Package Dimensioning: 21 pages.

U.S. Appl. No. 14/490,989, not yet published, filed Sep. 19, 2014, Intermec IP Corporation, Volume Dimensioning System Calibration Systems and Methods.

Wikipedia, YUV description and definition, downloaded from http://www.wikipeida.org/wiki/YUV on Jun. 29, 2012, 10 pages.

YUV Pixel Format, downloaded from http://www.fsource.org/yuv.php on Jun. 29, 2012; 13 pages.

YUV to RGB Conversion, downloaded from http://www.fource.org/fccyvrgb.php on Jun. 29, 2012; 5 pages.

Benos et al., "Semi-Automatic Dimensioning with Imager of a Portable Device," U.S. Appl. No. 61/149,912, filed Feb. 4, 2009 (now expired), 56 pages.

Dimensional Weight—Wikipedia, the Free Encyclopedia, URL=http://en.wikipedia.org/wiki/Dimensional_weight, download date Aug. 1, 2008, 2 pages.

Dimensioning—Wikipedia, the Free Encyclopedia, URL=http://en.wikipedia.org/wiki/Dimensioning, download date Aug. 1, 2008, 1 page.

U.S. Appl. No. 13/367,978, filed Feb. 7, 2012, (Feng et al.); now abandoned.

U.S. Appl. No. 14/462,801 for Mobile Computing Device With Data Cognition Software, filed Aug. 19, 2014 (Todeschini et al.); 38 pages.

U.S. Appl. No. 14/596,757 for System and Method for Detecting Barcode Printing Errors filed Jan. 14, 2015 (Ackley); 41 pages.

U.S. Appl. No. 14/277,337 for Multipurpose Optical Reader, filed May 14, 2014 (Jovanovski et al.); 59 pages.

U.S. Appl. No. 14/200,405 for Indicia Reader for Size-Limited Applications filed Mar. 7, 2014 (Feng et al.); 42 pages.

U.S. Appl. No. 14/662,922 for Multifunction Point of Sale System filed Mar. 19, 2015 (Van Horn et al.); 41 pages.

U.S. Appl. No. 14/446,391 for Multifunction Point of Sale Apparatus With Optical Signature Capture filed Jul. 30, 2014 (Good et al.); 37 pages.

U.S. Appl. No. 29/528,165 for In-Counter Barcode Scanner filed May 27, 2015 (Oberpriller et al.); 13 pages.

U.S. Appl. No. 29/528,890 for Mobile Computer Housing filed Jun. 2, 2015 (Fitch et al.); 61 pages.

U.S. Appl. No. 14/614,796 for Cargo Apportionment Techniques filed Feb. 5, 2015 (Morton et al.); 56 pages.

U.S. Appl. No. 29/516,892 for Table Computer filed Feb. 6, 2015 (Bidwell et al.); 13 pages.

U.S. Appl. No. 29/523,098 for Handle for a Tablet Computer filed Apr. 7, 2015 (Bidwell et al.); 17 pages.

U.S. Appl. No. 14/578,627 for Safety System and Method filed Dec. 22, 2014 (Ackley et al.); 32 pages.

U.S. Appl. No. 14/573,022 for Dynamic Diagnostic Indicator Generation filed Dec. 17, 2014 (Goldsmith); 43 pages.

U.S. Appl. No. 14/529,857 for Barcode Reader With Security Features filed Oct. 31, 2014 (Todeschini et al.); 32 pages.

U.S. Appl. No. 14/519,195 for Handheld Dimensioning System With Feedback filed Oct. 21, 2014 (Laffargue et al.); 39 pages.

U.S. Appl. No. 14/519,211 for System and Method for Dimensioning filed Oct. 21, 2014 (Ackley et al.); 33 pages.

U.S. Appl. No. 14/519,233 for Handheld Dimensioner With Data-Quality Indication filed Oct. 21, 2014 (Laffargue et al.); 36 pages.

(56) References Cited

OTHER PUBLICATIONS

U.S. Appl. No. 14/533,319 for Barcode Scanning System Using Wearable Device With Embedded Camera filed Nov. 5, 2014 (Todeschini); 29 pages.
U.S. Appl. No. 14/748,446 for Cordless Indicia Reader With a Multifunction Coil for Wireless Charging and EAS Deactivation, filed Jun. 24, 2015 (Xie et al.); 34 pages.
U.S. Appl. No. 29/528,590 for Electronic Device filed May 29, 2015 (Fitch et al.); 9 pages.
U.S. Appl. No. 14/519,249 for Handheld Dimensioning System With Measurement-Conformance Feedback filed Oct. 21, 2014 (Ackley et al.); 36 pages.
U.S. Appl. No. 29/519,017 for Scanner filed Mar. 2, 2015 (Zhou et al.); 11 pages.
U.S. Appl. No. 14/398,542 for Portable Electronic Devices Having a Separate Location Trigger Unit for Use in Controlling an Application Unit filed Nov. 3, 2014 (Sian et al.); 22 pages.
U.S. Appl. No. 14/405,278 for Design Pattern for Secure Store filed Mar. 9, 2015 (Zhu et al.); 23 pages.
U.S. Appl. No. 14/590,024 for Shelving and Package Locating Systems for Delivery Vehicles filed Jan. 6, 2015 (Payne); 31 pages.
U.S. Appl. No. 14/568,305 for Auto-Contrast Viewfinder for an Indicia Reader filed Dec. 12, 2014 (Todeschini); 29 pages.
U.S. Appl. No. 29/526,918 for Charging Base filed May 14, 2015 (Fitch et al.); 10 pages.
U.S. Appl. No. 14/580,262 for Media Gate for Thermal Transfer Printers filed Dec. 23, 2014 (Bowles); 36 pages.
U.S. Appl. No. 14/519,179 for Dimensioning System With Multipath Interference Mitigation filed Oct. 21, 2014 (Thuries et al.); 30 pages.
U.S. Appl. No. 14/264,173 for Autofocus Lens System for Indicia Readers filed Apr. 29, 2014, (Ackley et al.); 39 pages.
U.S. Appl. No. 14/453,019 for Dimensioning System With Guided Alignment, filed Aug. 6, 2014 (Li et al.); 31 pages.
U.S. Appl. No. 14/452,697 for Interactive Indicia Reader , filed Aug. 6, 2014, (Todeschini); 32 pages.
U.S. Appl. No. 14/231,898 for Hand-Mounted Indicia-Reading Device with Finger Motion Triggering filed Apr. 1, 2014 (Van Horn et al.); 36 pages.
U.S. Appl. No. 14/715,916 for Evaluating Image Values filed May 19, 2015 (Ackley); 60 pages.
U.S. Appl. No. 14/513,808 for Identifying Inventory Items in a Storage Facility filed Oct. 14, 2014 (Singel et al.); 51 pages.
U.S. Appl. No. 29/458,405 for an Electronic Device, filed Jun. 19, 2013 (Fitch et al.); 22 pages.
U.S. Appl. No. 29/459,620 for an Electronic Device Enclosure, filed Jul. 2, 2013 (London et al.); 21 pages.
U.S. Appl. No. 14/483,056 for Variable Depth of Field Barcode Scanner filed Sep. 10, 2014 (McCloskey et al.); 29 pages.
U.S. Appl. No. 14/531,154 for Directing an Inspector Through an Inspection filed Nov. 3, 2014 (Miller et al.); 53 pages.
U.S. Appl. No. 29/525,068 for Tablet Computer With Removable Scanning Device filed Apr. 27, 2015 (Schulte et al.); 19 pages.
U.S. Appl. No. 29/468,118 for an Electronic Device Case, filed Sep. 26, 2013 (Oberpriller et al.); 44 pages.
U.S. Appl. No. 14/340,627 for an Axially Reinforced Flexible Scan Element, filed Jul. 25, 2014 (Reublinger et al.); 41 pages.
U.S. Appl. No. 14/676,327 for Device Management Proxy for Secure Devices filed Apr. 1, 2015 (Yeakley et al.); 50 pages.
U.S. Appl. No. 14/257,364 for Docking System and Method Using Near Field Communication filed Apr. 21, 2014 (Showering); 31 pages.
U.S. Appl. No. 14/327,827 for a Mobile-Phone Adapter for Electronic Transactions, filed Jul. 10, 2014 (Hejl); 25 pages.
U.S. Appl. No. 14/334,934 for a System and Method for Indicia Verification, filed Jul. 18, 2014 (Hejl); 38 pages.
U.S. Appl. No. 29/530,600 for Cyclone filed Jun. 18, 2015 (Vargo et al); 16 pages.
U.S. Appl. No. 14/707,123 for Application Independent DEX/UCS Interface filed May 8, 2015 (Pape); 47 pages.
U.S. Appl. No. 14/283,282 for Terminal Having Illumination and Focus Control filed May 21, 2014 (Liu et al.); 31 pages.
U.S. Appl. No. 14/619,093 for Methods for Training a Speech Recognition System filed Feb. 11, 2015 (Pecorari); 35 pages.
U.S. Appl. No. 29/524,186 for Scanner filed Apr. 17, 2015 (Zhou et al.); 17 pages.
U.S. Appl. No. 14/705,407 for Method and System to Protect Software-Based Network-Connected Devices From Advanced Persistent Threat filed May 6, 2015 (Hussey et al.); 42 pages.
U.S. Appl. No. 14/614,706 for Device for Supporting an Electronic Tool on a User's Hand filed Feb. 5, 2015 (Oberpriller et al.); 33 pages.
U.S. Appl. No. 14/628,708 for Device, System, and Method for Determining the Status of Checkout Lanes filed Feb. 23, 2015 (Todeschini); 37 pages.
U.S. Appl. No. 14/704,050 for Intermediate Linear Positioning filed May 5, 2015 (Charpentier et al.); 60 pages.
U.S. Appl. No. 14/529,563 for Adaptable Interface for a Mobile Computing Device filed Oct. 31, 2014 (Schoon et al.); 36 pages.
U.S. Appl. No. 14/705,012 for Hands-Free Human Machine Interface Responsive to a Driver of a Vehicle filed May 6, 2015 (Fitch et al.); 44 pages.
U.S. Appl. No. 14/715,672 for Augumented Reality Enabled Hazard Display filed May 19, 2015 (Venkatesha et al.); 35 pages.
U.S. Appl. No. 14/695,364 for Medication Management System filed Apr. 24, 2015 (Sewell et al.); 44 pages.
U.S. Appl. No. 14/664,063 for Method and Application for Scanning a Barcode With a Smart Device While Continuously Running and Displaying an Application on the Smart Device Display filed Mar. 20, 2015 (Todeschini); 37 pages.
U.S. Appl. No. 14/735,717 for Indicia-Reading Systems Having an Interface With a User's Nervous System filed Jun. 10, 2015 (Todeschini); 39 pages.
U.S. Appl. No. 14/527,191 for Method and System for Recognizing Speech Using Wildcards in an Expected Response filed Oct. 29, 2014 (Braho et al.); 45 pages.
U.S. Appl. No. 14/702,110 for System and Method for Regulating Barcode Data Injection Into a Running Application on a Smart Device filed May 1, 2015 (Todeschini et al.); 38 pages.
U.S. Appl. No. 14/535,764 for Concatenated Expected Responses for Speech Recognition filed Nov. 7, 2014 (Braho et al.); 51 pages.
U.S. Appl. No. 14/687,289 for System for Communication Via a Peripheral Hub filed Apr. 15, 2015 (Kohtz et al.); 37 pages.
U.S. Appl. No. 14/747,197 for Optical Pattern Projector filed Jun. 23, 2015 (Thuries et al.); 33 pages.
U.S. Appl. No. 14/674,329 for Aimer for Barcode Scanning filed Mar. 31, 2015 (Bidwell); 36 pages.
U.S. Appl. No. 14/702,979 for Tracking Battery Conditions filed May 4, 2015 (Young et al.); 70 pages.
U.S. Appl. No. 29/529,441 for Indicia Reading Device filed Jun. 8, 2015 (Zhou et al.); 14 pages.
U.S. Appl. No. 14/747,490 for Dual-Projector Three-Dimensional Scanner filed Jun. 23, 2015 (Jovanovski et al.); 40 pages.
U.S. Appl. No. 14/740,320 for Tactile Switch for a Mobile Electronic Device filed Jun. 16, 2015 (Barndringa); 38 pages.
U.S. Appl. No. 14/695,923 for Secure Unattended Network Authentication filed Apr. 24, 2015 (Kubler et al.); 52 pages.
U.S. Appl. No. 14/740,373 for Calibrating a Volume Dimensioner filed Jun. 16, 2015 (Ackley et al.); 63 pages.
U.S. Appl. No. 14/800,757 , Eric Todeschini, filed Jul. 16, 2015, not published yet, Dimensioning and Imaging Items, 80 pages.
Proesmans, Marc et al. "Active Acquisition of 3D Shape for Moving Objects" 0-7803-3258-X/96 1996 IEEE; 4 pages.
U.S. Appl. No. 14/747,197, Serge Thuries et al., filed Jun. 23, 2015, not published yet, Optical Pattern Projector; 33 pages.
U.S. Appl. No. 14/747,490, Brian L. Jovanovski et al., filed Jun. 23, 2015, not published yet, Dual-Projector Three-Dimensional Scanner; 40 pages.
U.S. Appl. No. 14/715,916, H. Sprague Ackley, filed May 19, 2015, not published yet, Evaluating Image Values; 54 pages.
U.S. Appl. No. 14/793,149, H. Sprague Ackley, filed Jul. 7. 2015, not published yet, Mobile Dimensioner Apparatus for Use in Commerce; 57 pages.

(56) References Cited

OTHER PUBLICATIONS

U.S. Appl. No. 14/740,373, H. Sprague Ackley et al., filed Jun. 16, 2015, not published yet, Calibrating a Volume Dimensioner; 63 pages.
U.S. Appl. No. 14/801,023, Tyler Doomenbal et al., filed Jul. 16, 2015, not published yet, Adjusting Dimensioning Results Using Augmented Reality, 39 pages.
Leotta, Matthew, Generic, Deformable Models for 3-D Vehicle Surveillance, May 2010, Doctoral Dissertation, Brown University, Providence RI, 248 pages.
Ward, Benjamin, Interactive 3D Reconstruction from Video, Aug. 2012, Doctoral Thesis, Univesity of Adelaide, Adelaide, South Australia, 157 pages.
Hood, Frederick W.; William A. Hoff, Robert King, Evaluation of an Interactive Technique for Creating Site Models from Range Data, Apr. 27-May 1, 1997 Proceedings of the ANS 7th Topical Meeting on Robotics & Remote Systems, Augusta GA, 9 pages.
Gupta, Alok; Range Image Segmentation for 3-D Objects Recognition, May 1988, Technical Reports (CIS), Paper 736, University of Pennsylvania Department of Computer and Information Science, retrieved from Http://repository.upenn.edu/cis_reports/736, Accessed May 31, 2015, 157 pages.
Reisner-Kollmann,Irene; Anton L. Fuhrmann, Werner Purgathofer, Interactive Reconstruction of Industrial Sites Using Parametric Models, May 2010, Proceedings of the 26th Spring Conference of Computer Graphics SCCG "10, 8 pages.
Drummond, Tom; Roberto Cipolla, Real-Time Visual Tracking of Complex Structures, Jul. 2002, IEEE Transactions on Pattern Analysis and Machine Intelligence, vol. 24, No. 7; 15 pages.
Zhang, Zhaoxiang; Tieniu Tan, Kaiqi Huang, Yunhong Wang; Three-Dimensional Deformable-Model-based Localization and Recognition of Road Vehicles; IEEE Transactions on Image Processing, vol. 21, No. 1, Jan. 2012, 13 pages.
Leotta, Matthew J.; Joseph L. Mundy; Predicting High Resolution Image Edges with a Generic, Adaptive, 3-D Vehicle Model; IEEE Conference on Computer Vision and Pattern Recognition, 2009; 8 pages.
Spiller, Jonathan; Object Localization Using Deformable Templates, Master's Dissertation, University of the Witwatersrand, Johannesburg, South Africa, 2007; 74 pages.
EP Search and Written Opinion Report in related matter EP Application No. 14181437.6, dated Mar. 26, 2015, 7 pages.
Hetzel, Gunter et al.; "3D Object Recognition from Range Images using Local Feature Histograms,", Proceedings 2OO1 IEEE Conference on Computer Vision and Pattern Recognition. CVPR 2001. Kauai, Hawaii, Dec. 8-14, 2001; pp. 394-399, XP010584149, ISBN: 978-0-7695-1272-3.
Intention to Grant in counterpart European Application No. 14157971.4 dated Apr. 14, 2015, pp. 1-8.
Decision to Grant in counterpart European Application No. 14157971.4 dated Aug. 6, 2015, pp. 1-2.
Salvi, Joaquim et al. "Pattern Codification Strategies in Structured Light Systems" published in Pattern Recognition; The Journal of the Pattern Recognition Society, 23 pages.
Office Action in counterpart European Application No. 13186043.9 dated Sep. 30, 2015, pp. 1-7.
Lloyd et al., "System for Monitoring the Condition of Packages Throughout Transit", U.S. Appl. No. 14/865,575, filed Sep. 25, 2015, 59 pages, not yet published.
James Chamberlin, "System and Method for Picking Validation", U.S. Appl. No. 14/865,797, filed Sep. 25, 2015, 44 pages, not yet published.
Jovanovski et al., "Image-Stitching for Dimensioning", U.S. Appl. No. 14/870,488, filed Sep. 30, 2015, 45 pages, not yet published.
Todeschini et al.; "Depth Sensor Based Auto-Focus System for an Indicia Scanner," U.S. Appl. No. 14/872,176, filed Oct. 1, 2015, 44 pages, not yet published.
Wikipedia, "3D projection" Downloaded on Nov. 25, 2015 from www.wikipedia.com, 4 pages.
McCloskey et al., "Methods for Improving the Accuracy of Dimensioning-System Measurements," U.S. Appl. No. 14/873,613, filed Sep. 2, 2015, 47 pages, not yet published.
Search Report in counterpart European Application No. 15182675.7, dated Dec. 4, 2015, 10 pages.
McCloskey et al., "Image Transformation for Indicia Reading," U.S. Appl. No. 14/982,032, filed Oct. 30, 2015, 48 pages, not yet published.
Search Report and Opinion in related GB Application No. 1517112.7, dated Feb. 19, 2016, 6 Pages (GB2503978 is a commonly owned now abandoned application and not cited above).
European Search Report for Related EP Application No. 15189214.8, dated Mar. 3, 2016, 9 pages.
Lloyd, Ryan and Scott McCloskey, "Recognition of 3D Package Shapes for Singe Camera Metrology" IEEE Winter Conference on Applications of computer Visiona, IEEE, Mar. 24, 2014, pp. 99-106, {retrieved on Jun. 16, 2014}, Authors are employees of common Applicant.
Great Britain Combined Search and Examination Report in related Application GB1517842.9, dated Apr. 8, 2016, 8 pages.
European Partial Search Report for related EP Application No. 15190306.9, dated May 6, 2016, 8 pages.
Mike Stensvold, "get the Most Out of Variable Aperture Lenses", published on www.OutdoorPhotogrpaher.com; dated Dec. 7, 2010; 4 pages, [As noted on search report retrieved from URL: http;// www.outdoorphotographer.com/gear/lenses/get-the-most-out-ofvariable-aperture-lenses.html on Feb. 9, 2016].
European Search Report for related EP Application No. 16152477.2, dated May 24, 2016, 8 pages [New Reference cited herein; Reference DE102007037282 A1 and its US Counterparts have been previously cited.]
Second Chinese Office Action in related CN Application No. 201520810685.6, dated Mar. 22, 2016, 5 pages, no references.
European Search Report in related EP Application No. 15190315.0, dated Apr. 1, 2016, 7 pages. [Commonly owned Reference 2014/0104416 has been previously cited].
Second Chinese Office Action in related CN Application No. 2015220810562.2, dated Mar. 22, 2016, 5 pages. English Translation provided [No references].
European Search Report for related Application EP 15190249.1, dated Mar. 22, 2016, 7 pages.
Second Chinese Office Action in related CN Application No. 201520810313.3, dated Mar. 22, 2016, 5 pages. English Translation provided [No references].
Search Report and Opinion in Related EP Application 15176943.7, dated Jan. 8, 2016, 8 pages, (US Application 2014/0049635 has been previously cited).
European Search Report for related EP Application No. 15188440.0, dated Mar. 8, 2016, 8 pages.
United Kingdom Search Report in related application GB1517842.9, dated Apr. 8, 2016, 8 pages.
Great Britain Search Report for related Application on. GB1517843.7, dated Feb. 23, 2016; 8 pages.
European extended Search report in related EP Application 13785171.3, dated Sep. 19, 2016, 8 pages.
El-Hakim et al., "Multicamera vision-based approach to flexible feature measurement for inspection and reverse engineering", published in Optical Engineering, Society of Photo-Optical Instrumentation Engineers, vol. 32, No. 9, Sep. 1, 1993, 15 pages.
El-Hakim et al., "A Knowledge-based Edge/Object Measurement Technique", Retrieved from the Internet: URL: https://www.researchgate.net/profile/Sabry_E1-Hakim/publication/44075058_A_Knowledge_Based_EdgeObject_Measurement_Technique/links/00b4953b5faa7d3304000000.pdf [retrieved on Jul. 15, 2016] dated Jan. 1, 1993, 9 pages.
European Extended search report in related EP Application No. 15190306.9, Dated Sep. 9, 2016, 15 pages [only new references are cited; remaining references were cited with partial search report in same application dated May 6, 2016].
Collings et al., "The Applications and Technology of Phase-Only Liquid Crystal on Silicon Devices", Journal of Display Technology, IEEE Service Center, New, York, NY, US, vol. 7, No. 3, Mar. 1, 2011 (Mar. 1, 2011), pp. 112-119.

(56) References Cited

OTHER PUBLICATIONS

European Search Report from related EP Application No. 16168216.6, dated Oct. 20, 2016, 8 pages. [New reference cited above; U.S. Publication 2014/0104413 has been previously cited].
European Extended Search Report in Related EP Application No. 16172995.9, dated Aug. 22, 2016, 11 pages (Only new references have been cited; U.S. Pat. No. 8,463,079 (formerly U.S. Publication 2010/0220894) and U.S. Publication 2001/0027955 have been previously cited.).
M.Zahid Gurbuz, Selim Akyokus, Ibrahim Emiroglu, Aysun Guran, An Efficient Algorithm for 3D Rectangular Box Packing, 2009, Applied Automatic Systems: Proceedings of Selected AAS 2009 Papers, pp. 131-134.
United Kingdom combined Search and Examination Report in related GB Application No. 1607394.2, dated Oct. 9, 2016, 7 pages.
Padzensky, Ron; "Gesture Control", Dated Apr. 18, 2015, 15 pages.
Grabowski, Ralph; "New Commands in AutoCADS 2010: Part 11 Smoothing 3D Mesh Objects" Dated 2011, 6 pages.
Theodoropoulos, Gabriel; "Using Gesture Recognizers to Handle Pinch, Rotate, Pan, Swipe, and Tap Gestures" dated Aug. 25, 2014, 34 pages.
European Extended Search Report in related EP Application No. 16190017.0, dated Jan. 4, 2017, 6 pages.
European Extended Search Report in related EP Application No. 16173429.8, dated Dec. 1, 2016, 8 pages [Only new references cited: US 2013/0038881 was previously cited].
Extended European Search Report in related EP Application No. 16175410.0, dated Dec. 13, 2016, 5 pages.
Wikipedia, "Microlens", Downloaded from https://en.wikipedia.org/wiki/Microlens, pp. 3. {Feb. 9, 2017 Final Office Action in related matter}.
Fukaya et al., "Characteristics of Speckle Random Pattern and Its Applications", pp. 317-327, Nouv. Rev. Optique, t.6, n.6. (1975) {Feb. 9, 2017 Final Office Action in related matter: downloaded Mar. 2, 2017 from http://iopscience.iop.org}.
European Examination report in related EP Application No. 14181437.6, dated Feb. 8, 2017, 5 pages [References have been previously cited].
European extended search report in related EP Application 16190833.0, dated Mar. 9, 2017, 8 pages [US Publication 2014/0034731 was previously cited].
United Kingdom Combined Search and Examination Report in related Application No. GB1620676.5, dated Mar. 8, 2017, 6 pages [References have been previously cited; WO2014/151746, WO2012/175731, US 2014/0313527, GB2503978].
European Exam Report in related , EP Application No. 16168216.6, dated Feb. 27, 2017, 5 pages, [References have been previously cited; WO2011/017241 and US 2014/0104413].
Thorlabs, Advisory Action dated Apr. 12, 2017 in related commonly owned application, downloaded from https://www.thorlabs.com/newgrouppage9.cfm?objectgroup_id=6430, 4 pages.
EKSMA Optics, Advisory Action dated Apr. 12, 2017 in related commonly owned application, downloaded from http://eksmaoptics.com/optical-systems/f-theta-lenses/f-theta-lens-for-1064-nm/, 2 pages.
Sill Optics, Advisory Action dated Apr. 12, 2017 in related commonly owned application, http://www.silloptics.de/1/products/sill-encyclopedia/laser-optics/f-theta-lenses/, 4 pages.
Chinese Notice of Reexamination in related Chinese Application 201520810313.3, dated Mar. 14, 2017, English computer Translation provided, 7 pages.
Extended European search report in related EP Application 16199707.7, dated Apr. 10, 2017, 15 pages.
Ulusoy et al., One-Shot Scanning using De Bruijn Spaced Grids, 2009 IEEE 12th International Conference on Computer Vision Workshops, ICCV Workshops, 7 pages [Cited in EP Extended search report dated Apr. 10, 2017].
European Exam Report in related EP Application No. 15176943.7, dated Apr. 12, 2017, 6 pages.
European Exam Report in related EP Application No. 15188440.0, dated Apr. 21, 2017, 4 pages.
Ralph Grabowski, "Smothing 3D Mesh Objects," New Commands in AutoCAD 2010: Part 11, 6 pages.
European Exam Report in related EP Application No. 16152477.2, dated Jun. 20, 2017, 4 pages [No art to be cited].
European Exam Report in related EP Applciation 16172995.9, dated Jul. 6, 2017, 9 pages [No new art to be cited].
United Kingdom Search Report in related Application No. GB1700338.5, dated Jun. 30, 2017, 5 pages.
European Search Report in related EP Application No. 17175357.7, dated Aug. 17, 2017, pp. 1-7 [No new art to be cited].
Boavida et al., "Dam monitoring using combined terrestrial imaging systems", 2009 Civil Engineering Survey De/Jan. 2009, pp. 33-38 {Cited in Notice of Allowance dated Sep. 15, 2017 in related matter}.
EP Search Report in related EP Application No. 17171844 dated Sep. 18, 2017. 4 pages [Only new art cited herein}.
EP Extended Search Report in related EP Applicaton No. 17174843.7 dated Oct. 17, 2017, 5 pages {Only new art cited herein}.
UK Further Exam Report in related UK Application No. GB1517842.9, dated Sep. 1, 2017, 5 pages (only new art cited herein).

* cited by examiner

HANDHELD DIMENSIONING SYSTEM WITH MEASUREMENT-CONFORMANCE FEEDBACK

FIELD OF THE INVENTION

The present invention relates to dimensioning systems, and in particular, to a handheld dimensioning system that can provide feedback relating to a dimension measurement's conformance with a measurement-accuracy criteria.

BACKGROUND

Dimensioning is the process of measuring the cubic space that an object (e.g., package) occupies. Automatic dimensioning systems may be used for calculating an object's dimensional weight to facilitate storage, handling, transporting, and/or invoicing. Transport vehicles and storage units, for example, have both volume and weight capacity limits. They can become full before they reach their weight capacity leading to inefficiencies. By dimensioning objects, parcels, and pallets, shipping companies and warehouses can make optimal use of space and charge for services accordingly. As a result, dimensioning systems that help gather this information without causing a disruption in the workflow are highly desirable. As these devices become increasingly part of commercial processes, their accuracy becomes an important characteristic to understand.

Standards have been developed for weights and measures. These standards promote a healthy business and consumer climate by providing specifications to insure uniform and equitable measurements. Measurement devices that comply with these specifications are trusted and useful tools for commerce.

Handheld dimensioners may be used for automatically determining the dimensions of a package without manually manipulating the package. The measurement environments for this type of dimensioner are highly varied, and as a result the accuracy (i.e., the minimum dimension that can be measured) of the handheld dimensioner may vary for different measurement circumstances. Industry standards require that dimension measurements conform to an accuracy criteria, however it is easy for a typical user to violate these criteria when using a handheld dimensioner. For example, when a user tries to measure a small package at a large distance then the accuracy of the measurement may violate the specifications of the standard. Here, a more accurate measurement (i.e., conforming to the standard) could be made if the handheld dimensioning system was moved closer and the measurement was repeated.

Therefore, a need exists for a handheld dimension system that automatically provides measurement-conformance feedback so the handheld dimensioning system's measurements remain in conformance.

SUMMARY

Accordingly, in one aspect, the present invention embraces a method for generating measurement-conformance feedback using a handheld dimensioning system. The method includes the step of using a dimensioning-system image-sensor to capture at least one image an object (or objects) in the handheld dimensioning system's field-of-view. A dimensioning system processor then uses this image (or images) to compute a measurement geometry. The processor uses the measurement geometry to derive a measurement accuracy, and then identify at least one conformance criteria based on this measurement accuracy. The captured image is then used by the dimensioning-system processor to obtain a dimensioning measurement. By comparing the dimension measurement to the conformance criteria, the dimensioning-system processor may generate measurement-conformance feedback corresponding to the results of this comparison.

In an exemplary embodiment, the method's measurement-conformance feedback includes an adjustment message. The adjustment message provides instructive prompts to facilitate the adjustment of the measurement geometry in order to achieve measurement conformance.

In another aspect, the present invention embraces a handheld dimension system that provides measurement conformance feedback. The dimensioning system includes an imaging subsystem. The imaging subsystem uses at least one image sensor to capture an image of an object (or objects) within a field-of-view. The image sensor (or sensors) are communicatively coupled to a control subsystem. The control subsystem includes a processor (or processors) and at one non-transitory storage medium that can store information and processor-executable instructions. These processor-executable instructions configure the processor to receive images from the image sensor (or sensors) and compute (using these received images) a measurement geometry. A measurement accuracy corresponding to the measurement geometry is then derived and a conformance criteria based on this measurement accuracy is identified. The processor-executable instructions next configure the processor to use the received images to obtain a dimension measurement. By comparing the dimension measurement to the identified conformance criteria, measurement-conformance feedback is generated.

In an exemplary embodiment, the handheld dimensioning system's conformance criteria is in compliance with the specifications for dimension measuring devices described in the 2013 edition of the NIST Handbook 44, section 5.58 and is hereby incorporated by reference.

The foregoing illustrative summary, as well as other exemplary objectives and/or advantages of the invention, and the manner in which the same are accomplished, are further explained within the following detailed description and its accompanying drawings.

DETAILED DESCRIPTION

Figure 1:
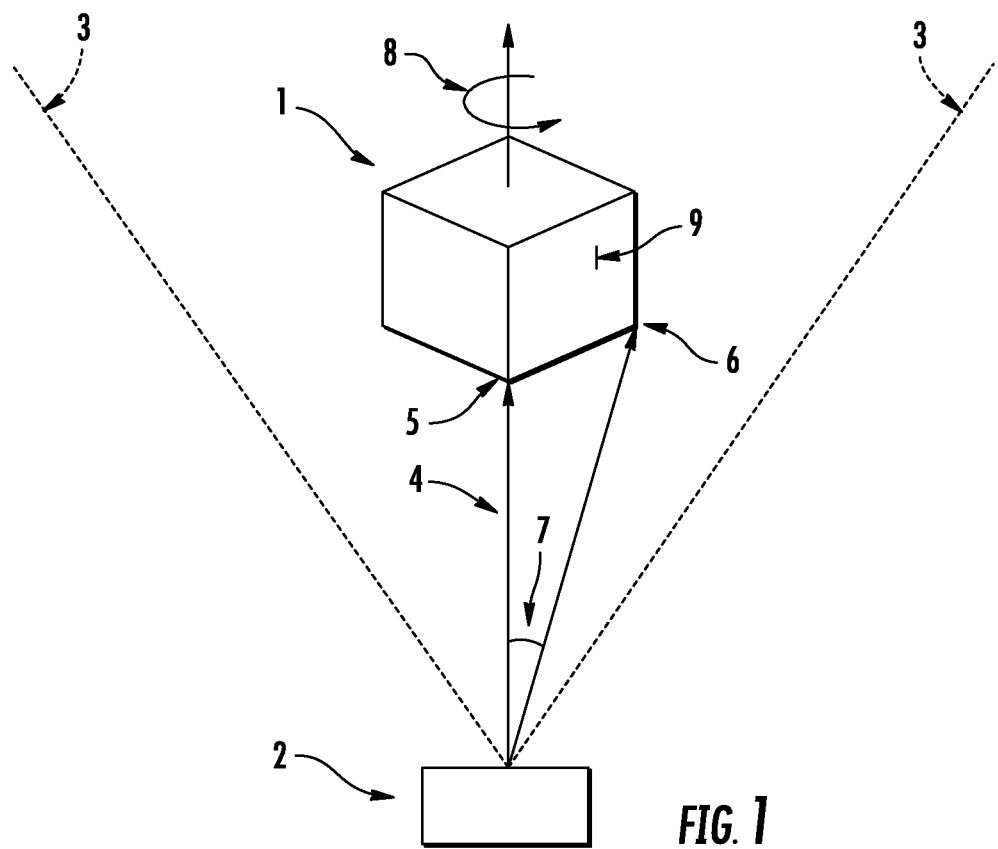
FIG. 1 schematically depicts the measurement geometry.

The present invention embraces a handheld dimensioning system capable of providing measurement-conformance feedback regarding the accuracy of the measurement.

Dimensioning is the process of remotely measuring an object's dimensions using a dimensioning system (i.e., dimensioner). Typically, the object analyzed is a cubic package and the dimension measured is the object's volume. Measuring a package's volume is especially important in the shipping and warehousing industries, which may have space and/or weight restrictions. For example, the cost to ship a package has historically been based on the package's weight. Charging by weight alone, however, may cause a shipment of a lightweight package with a large volume to become unprofitable. As a result, dimension measurements are often required to compute shipping costs.

Dimensioning systems may be static in the sense that a package is unmoving during a measurement. Alternatively, a dimensioning system may be dynamic where the package moves during measurement (e.g., moving along a conveyor). In both of these cases, the dimensioning system is typically mounted in a fixed position and the imaging environment is carefully controlled. The most promising dimensioning system configuration, however, is handheld, which could adapt to almost any environment.

Handheld dimensioning is a challenging problem. In handheld applications, the environment is uncontrolled and the dimensioner must accommodate a range of measurement conditions, including lighting, motion, and the measurement geometry (e.g., spatial relationships and orientations). In addition, handheld applications typically have a low tolerance for excessive measurement times or alignment complexities. Thus, the sensing technology chosen for such applications must accommodate these issues.

A variety of sensing technologies have been employed for dimensioning. One exemplary sensing technology uses a three-dimensional (i.e., 3D) camera to obtain depth information. 3D cameras use the displacement in the apparent position of an object when viewed along two lines of sight (i.e., parallax) to derive depth information.

Another exemplary sensing technology uses structured light. Structure light is the process of projecting a known light pattern (e.g., dots, grids, bars, stripes, checkerboard, etc.) onto a scene (i.e., field of view). A pattern image is then captured by an image sensor and distortions in the pattern caused by objects in the field-of-view can be analyzed to derive depth information.

Yet another exemplary sensing technology uses time-of-flight (TOF) to determine depth information. Here the depth information can be derived by calculating the time it takes for a projected light beam to reflect from an object back to a sensor (i.e., time-of-flight). Time-of-flight is similar to the principles of radar, except that a light pulse is used instead of an RF pulse.

In each of these exemplary embodiments, an imaging subsystem with at least one image sensor is used to capture an image (or images) of an object (or objects) in a field-of-view. A dimensioner can also measure the space that is not occupied by objects. For example, the volume left in a delivery truck, the dimensions of an empty concrete form, or the volume between attic beams. In each of these examples, a volume calculation would be helpful to insure proper filling.

Importantly, the accuracy for dimensioners depends on the measurement geometry and the sensor-subsystem specification (e.g., resolution, field-of-view, etc.). This accuracy may change depending on the measurement conditions (e.g., the measurement geometry).

Measurement geometry refers to the dimensioning-measurement setup (e.g., the spatial relationship between the dimensioning system and the object). As shown in FIG. 1, a dimensioning system's 2 field-of-view 3 is placed in front of an object for dimensioning 1. The object is at a range 4 (i.e., the distance between the dimensioning system and the object) so that it is completely encompassed within the field-of-view 3. Typically, three sides must be visible to the dimensioning system 2 for volume measurements. This means that the edges 5,6 of an object surface 9 should create an angle 7 with respect to the dimensioning system as shown in FIG. 1. In other words, an object surface 9 must be visible to the imaging subsystem for sensing. For example, when using a projected light pattern to sense depth information (e.g., structured light), an object's side must reflect some minimum fraction of the light pattern in order for depth information for that surface to be derived. In the exemplary case shown in FIG. 1, the object 1 can be rotated 8 to adjust this angle 7. A possible embodiment of the present invention is to provide feedback to facilitate the adjustment (e.g., rotation, range, etc.) of the measurement geometry in order to make sensing possible. In other words, the dimensioner may recognize poorly positioned objects and provide prompts alerting a user and offering adjustment messages to make dimensioning possible (and/or more accurate).

Dimensioning-measurement confidence may be based on calculations using the received image. These calculations generate a confidence level for the dimensioning measurement. Specifically, calculating dimensions one pixel to either side of an object edge provides the range of confidence for the dimensioning measurement. For example, when the side surface 9 of the object 1 is viewed obliquely (as shown in FIG. 1), a single pixel consumes a larger portion of the image plane. Thus, calculating the surface dimensions one pixel to either side of an edge will show a variation in dimension measurements that is large with respect to the dimensions of the side 9. Conversely, if a box side is viewed nearly straight on, then calculating surface dimensions one pixel to either side of an edge will show only a small variation with respect to the dimension of that side. As a result, there is a higher confidence level associated with a dimensioning measurement for a side viewed nearly straight on than for one viewed obliquely.

The range 4 is important for dimension measurement accuracy. In general, the closer the object is to the dimensioning system, the greater the accuracy of the measurement. Put another way, the increment of measurement is smaller for closer objects than for objects further away. This can be understood by considering the field-of-view's size with respect to the object. If the dimensioning system, for example, samples depth evenly over the field-of-view 3, then small, faraway objects that occupy a small fraction of the field of view will have reduced depth sampling and therefore may be measured with less accuracy.

Guidelines for dimensioning measurements are provided for the United States by the National Institute of Standards and Technology (NIST) in the "NIST Handbook 44" 2013 edition and is therefore hereby incorporated by reference. These guidelines state that for a measurement to conform to the standard, the minimum object dimension must be at least twelve (12) times the smallest increment of length that can be measured.

To help understand the NIST guidelines consider the following exemplary dimensioning scenario. Two boxes at a distance of twelve feet (12') are to be measured using a dimensioning system. One box (i.e., box-one) is a cube of thirty-nine inches (39") per side and the other box (i.e., box-two) is a cube of thirteen inches (13") per side. Based on the range and the details of the imaging subsystem, suppose that the smallest increment of length that the exemplary dimensioning system can measure at this range (i.e., the increment of measurement) is 2 inches (2"). Box-one may be measured accurately and a typical measurement might be thirty-eight (38") or forty (40"). Box-two may return a measurement (e.g., 12" or 14") but this measurement would not be in conformance with the standard for accuracy since box-two is only thirteen inches (13") per side and the minimum length that can be measured (and still be in conformance with the standard) must be twelve times the smallest increment (i.e., 12×2"=24").

Now suppose that the measurement geometry in this exemplary dimensioning scenario is changed so box-two is only three feet (3') away from the dimensioning system. At this range the smallest increment of length that can be measured for this system is one-half an inch (0.5"). Box-one may now be measured in conformance with the standard and a typical measurement might be thirteen inches (13").

This example shows that while a measurement may be returned from a dimensioning system for all reasonable measurement geometries, the measurement returned may not be in conformance with the standard. This may not always be obvious to a user. What is needed is a dimensioning system that monitors this relationship between measurement accuracy and standard and that can provide a user with feedback messages concerning measurement-conformance. Further, if a measurement is impossible then this same system may also notify the user of this.

It should be noted that while particular sensor technologies and standards have been discussed so far, the concept disclosed could be applied any dimensioning system that uses a camera and could be applied using any reference or standard as a basis of conformance. Further, while handheld dimensioning systems are the most obvious type of dimensioning system that could utilize the measurement-conformance feedback, any dimensioning system that has an adjustable measurement geometry could make use of this as well.

Figure 2:
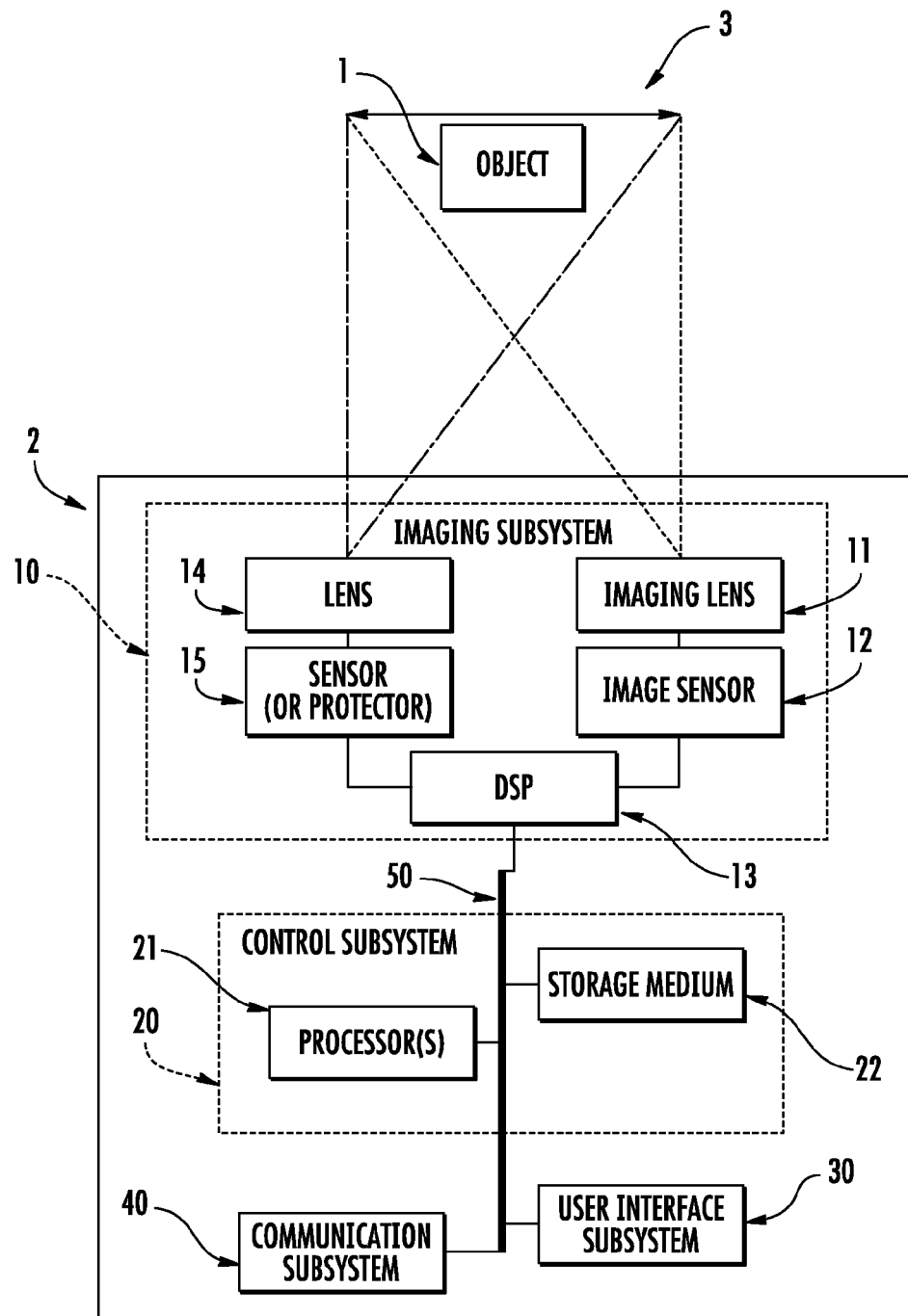
FIG. 2 schematically depicts a block diagram of an exemplary dimensioning system.

A block diagram of an exemplary embodiment of a dimensioning system is shown in FIG. 2. A handheld dimensioner 2 is positioned so that an object 1 may have its dimensions (e.g., volume) measured optically. To accomplish this measurement, the dimensioner 2 utilizes a variety of subsystems.

An imaging subsystem 10 captures depth information of the object 1 in a field of view 3. To accomplish this, the imaging subsystem uses an imaging lens 11 to focus a real image of the field of view onto an image sensor 12 to convert the optical image into an electronic signal. The image sensor 12 may be a charge coupled device (i.e., CCD) or a sensor using complementary metal oxide semiconductor (i.e., CMOS) technology. The image sensor 12 typically includes a plurality of pixels that sample the real image and convert the real-image intensity into an electronic signal. A processor (e.g., digital signal processor (DSP)) 13 is typically included to facilitate the formation of the digital image.

The creation of depth information is facilitated with a second element in the imaging subsystem that either transmits an optical signal (i.e., projector) or images a scene (i.e., sensor). The lens 14 for the sensor (or projector) 15 is typically configured into a stereo arrangement with the imaging lens 11 to allow for the collection of depth information (e.g., measurement of distances) using the principle of parallax. The sensor (or projector) 15 is typically communicatively coupled to the DSP 13 which facilitates is control, function, and communication.

A control subsystem 20 is communicatively coupled to the DSP 13 used by the sensor (or projector) 15 and the image sensor 12. The control subsystem 20 includes one or more processors 21 (e.g., one or more controllers, digital signal processor (DSP), application specific integrated circuit (ASIC), programmable gate array (PGA), and/or programmable logic controller (PLC)) to configure the imaging subsystem for the dimensioning data collection and then perform the processing necessary on data collected to generate dimensioning measurements and feedback. The processor 21 is typically configured by processor-executable instructions (i.e., a software program) stored in at least one non-transitory storage medium (i.e., memory) 22 (e.g., read only memory (ROM), flash memory, and/or a hard-drive). The processor-executable instructions, when executed by the processor 21 configures the processor to: (i) receive images from the image sensor(s), (ii) compute a measurement geometry, (iii) derive a measurement accuracy, (iv) identify a conformance criteria, (v) obtain a dimension measurement, and (vi) compare the dimension measurement to the conformance criteria in order to generate measurement-conformance feedback.

The dimensioning system 2 may also include a user-interface subsystem 30 to display dimension measurements (e.g., linear dimension or volume) and measurement-conformance feedback. In some embodiments, the user-interface subsystem 30 may also facilitate the selection of dimensioning surfaces for dimensioning.

The dimensioner 2 may also include a communication subsystem 40 for transmitting and receiving information to/from a separate computing device or storage device. This communication subsystem may be wired or wireless and may enable communication with a variety of protocols (e.g., IEEE 802.11, including WI-FI®), BLUETOOTH®), CDMA, TDMA, or GSM).

The subsystems in the dimensioner 2 are electrically connected via a couplers (e.g., wires or fibers), buses, and control lines to form an interconnection subsystem 50. The interconnection system 50 may include power buses or lines, data buses, instruction buses, address buses, etc., which allow operation of the subsystems and interaction there between.

Figure 3:
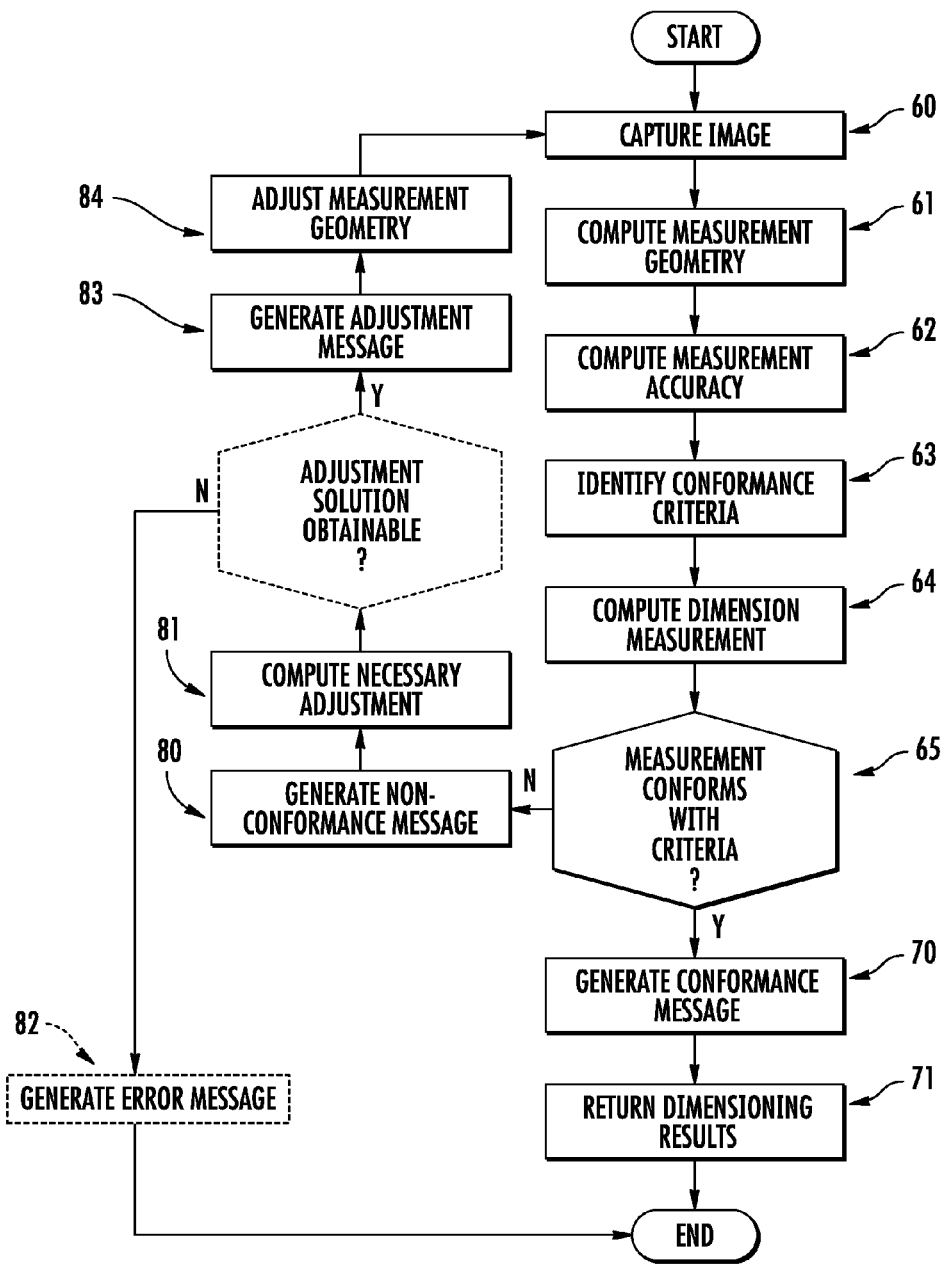
FIG. 3 schematically depicts a flow chart of an exemplary method for generating measurement-conformance feedback.

A block diagram representing an exemplary method to generate measurement-conformance feedback for a dimension measurement is shown in FIG. 3. The method begins with the step of capturing of an image using a dimensioning system 60. The image may contain one or more objects for dimensioning and covers a field of view. From this image, a measurement geometry may be computed 61. The measurement geometry includes information such as, range, object-surfaces, and object-orientation. From this information, the measurement accuracy may be computed 62. The accuracy includes the smallest increment of length that can be measured. This accuracy can be used to identify the conformance criteria 63. This is the criteria stipulated by a standard (e.g., NIST Standard) or other reference to assure the accuracy of a measurement. Next the image (or images) captured can be used to compute a dimension measurement 64. The dimension measurement may include object volume or a linear dimension like the length of an object surface. The dimension measurement may also include measurements of multiple objects within the field of view. At this point, the dimension measurement is compared to the conformance criteria and a decision is made 65. If the dimension measurement complies with the conformance criteria, then a conformance message may be generated 70 along with the dimensioning results 71. If, on the other hand, the dimension measurement is found not to comply with the conformance criteria then a non-conformance message may be generated 80. Then, to facilitate a good measurement, a necessary adjustment for the dimensioning system (relative to the object) may be computed 81 (e.g., move closer/farther-away or move left/right). If no solution is found, then an error message may be generated 82. This error may arise for dimensioning scenarios such as: objects with dimensions outside the range of the dimensioning system, measurement geometries beyond the dimensioner's capabilities (i.e., too far), or poor lighting. If a solution is found, however, an adjustment message may be generated 83 to help a user adjust the measurement geometry 84.

Once the dimensioning system is configured with a new measurement geometry, then the process 60,61,62,63,64 may repeat and the new dimensioning results can be compared with the computed conformance criteria for the new measurement geometry. The entire process continues until a conforming dimensioning result is found or found to be unobtainable. Several iterations may be required to reach a conforming measurement, but in the end, the user is assured that the measurement calculated is accurate and conforms to the standard.

To supplement the present disclosure, this application incorporates entirely by reference the following commonly assigned patents, patent application publications, and patent applications:

U.S. Pat. No. 6,832,725; U.S. Pat. No. 7,128,266;
U.S. Pat. No. 7,159,783; U.S. Pat. No. 7,413,127;
U.S. Pat. No. 7,726,575; U.S. Pat. No. 8,294,969;
U.S. Pat. No. 8,317,105; U.S. Pat. No. 8,322,622;
U.S. Pat. No. 8,366,005; U.S. Pat. No. 8,371,507;
U.S. Pat. No. 8,376,233; U.S. Pat. No. 8,381,979;
U.S. Pat. No. 8,390,909; U.S. Pat. No. 8,408,464;
U.S. Pat. No. 8,408,468; U.S. Pat. No. 8,408,469;
U.S. Pat. No. 8,424,768; U.S. Pat. No. 8,448,863;
U.S. Pat. No. 8,457,013; U.S. Pat. No. 8,459,557;
U.S. Pat. No. 8,469,272; U.S. Pat. No. 8,474,712;
U.S. Pat. No. 8,479,992; U.S. Pat. No. 8,490,877;
U.S. Pat. No. 8,517,271; U.S. Pat. No. 8,523,076;
U.S. Pat. No. 8,528,818; U.S. Pat. No. 8,544,737;
U.S. Pat. No. 8,548,242; U.S. Pat. No. 8,548,420;
U.S. Pat. No. 8,550,335; U.S. Pat. No. 8,550,354;
U.S. Pat. No. 8,550,357; U.S. Pat. No. 8,556,174;
U.S. Pat. No. 8,556,176; U.S. Pat. No. 8,556,177;
U.S. Pat. No. 8,559,767; U.S. Pat. No. 8,599,957;
U.S. Pat. No. 8,561,895; U.S. Pat. No. 8,561,903;
U.S. Pat. No. 8,561,905; U.S. Pat. No. 8,565,107;
U.S. Pat. No. 8,571,307; U.S. Pat. No. 8,579,200;
U.S. Pat. No. 8,583,924; U.S. Pat. No. 8,584,945;
U.S. Pat. No. 8,587,595; U.S. Pat. No. 8,587,697;
U.S. Pat. No. 8,588,869; U.S. Pat. No. 8,590,789;
U.S. Pat. No. 8,596,539; U.S. Pat. No. 8,596,542;
U.S. Pat. No. 8,596,543; U.S. Pat. No. 8,599,271;
U.S. Pat. No. 8,599,957; U.S. Pat. No. 8,600,158;
U.S. Pat. No. 8,600,167; U.S. Pat. No. 8,602,309;
U.S. Pat. No. 8,608,053; U.S. Pat. No. 8,608,071;
U.S. Pat. No. 8,611,309; U.S. Pat. No. 8,615,487;
U.S. Pat. No. 8,616,454; U.S. Pat. No. 8,621,123;
U.S. Pat. No. 8,622,303; U.S. Pat. No. 8,628,013;
U.S. Pat. No. 8,628,015; U.S. Pat. No. 8,628,016;
U.S. Pat. No. 8,629,926; U.S. Pat. No. 8,630,491;
U.S. Pat. No. 8,635,309; U.S. Pat. No. 8,636,200;
U.S. Pat. No. 8,636,212; U.S. Pat. No. 8,636,215;
U.S. Pat. No. 8,636,224; U.S. Pat. No. 8,638,806;
U.S. Pat. No. 8,640,958; U.S. Pat. No. 8,640,960;
U.S. Pat. No. 8,643,717; U.S. Pat. No. 8,646,692;
U.S. Pat. No. 8,646,694; U.S. Pat. No. 8,657,200;
U.S. Pat. No. 8,659,397; U.S. Pat. No. 8,668,149;
U.S. Pat. No. 8,678,285; U.S. Pat. No. 8,678,286;
U.S. Pat. No. 8,682,077; U.S. Pat. No. 8,687,282;
U.S. Pat. No. 8,692,927; U.S. Pat. No. 8,695,880;
U.S. Pat. No. 8,698,949; U.S. Pat. No. 8,717,494;
U.S. Pat. No. 8,717,494; U.S. Pat. No. 8,720,783;
U.S. Pat. No. 8,723,804; U.S. Pat. No. 8,723,904;
U.S. Pat. No. 8,727,223; U.S. Pat. No. D702,237;
U.S. Pat. No. 8,740,082; U.S. Pat. No. 8,740,085;
U.S. Pat. No. 8,746,563; U.S. Pat. No. 8,750,445;
U.S. Pat. No. 8,752,766; U.S. Pat. No. 8,756,059;
U.S. Pat. No. 8,757,495; U.S. Pat. No. 8,760,563;
U.S. Pat. No. 8,763,909; U.S. Pat. No. 8,777,108;
U.S. Pat. No. 8,777,109; U.S. Pat. No. 8,779,898;
U.S. Pat. No. 8,781,520; U.S. Pat. No. 8,783,573;
U.S. Pat. No. 8,789,757; U.S. Pat. No. 8,789,758;
U.S. Pat. No. 8,789,759; U.S. Pat. No. 8,794,520;
U.S. Pat. No. 8,794,522; U.S. Pat. No. 8,794,526;
U.S. Pat. No. 8,798,367; U.S. Pat. No. 8,807,431;
U.S. Pat. No. 8,807,432; U.S. Pat. No. 8,820,630;
International Publication No. 2013/163789;
International Publication No. 2013/173985;
International Publication No. 2014/019130;
International Publication No. 2014/110495;
U.S. Patent Application Publication No. 2008/0185432;
U.S. Patent Application Publication No. 2009/0134221;
U.S. Patent Application Publication No. 2010/0177080;
U.S. Patent Application Publication No. 2010/0177076;
U.S. Patent Application Publication No. 2010/0177707;
U.S. Patent Application Publication No. 2010/0177749;
U.S. Patent Application Publication No. 2011/0202554;
U.S. Patent Application Publication No. 2012/0111946;
U.S. Patent Application Publication No. 2012/0138685;
U.S. Patent Application Publication No. 2012/0168511;
U.S. Patent Application Publication No. 2012/0168512;
U.S. Patent Application Publication No. 2012/0193423;
U.S. Patent Application Publication No. 2012/0203647;
U.S. Patent Application Publication No. 2012/0223141;
U.S. Patent Application Publication No. 2012/0228382;
U.S. Patent Application Publication No. 2012/0248188;
U.S. Patent Application Publication No. 2013/0043312;
U.S. Patent Application Publication No. 2013/0056285;
U.S. Patent Application Publication No. 2013/0070322;
U.S. Patent Application Publication No. 2013/0075168;
U.S. Patent Application Publication No. 2013/0082104;
U.S. Patent Application Publication No. 2013/0175341;
U.S. Patent Application Publication No. 2013/0175343;
U.S. Patent Application Publication No. 2013/0200158;
U.S. Patent Application Publication No. 2013/0256418;
U.S. Patent Application Publication No. 2013/0257744;
U.S. Patent Application Publication No. 2013/0257759;
U.S. Patent Application Publication No. 2013/0270346;
U.S. Patent Application Publication No. 2013/0278425;
U.S. Patent Application Publication No. 2013/0287258;
U.S. Patent Application Publication No. 2013/0292475;
U.S. Patent Application Publication No. 2013/0292477;
U.S. Patent Application Publication No. 2013/0293539;
U.S. Patent Application Publication No. 2013/0293540;
U.S. Patent Application Publication No. 2013/0306728;
U.S. Patent Application Publication No. 2013/0306730;
U.S. Patent Application Publication No. 2013/0306731;
U.S. Patent Application Publication No. 2013/0307964;
U.S. Patent Application Publication No. 2013/0308625;
U.S. Patent Application Publication No. 2013/0313324;
U.S. Patent Application Publication No. 2013/0313325;
U.S. Patent Application Publication No. 2013/0341399;
U.S. Patent Application Publication No. 2013/0342717;
U.S. Patent Application Publication No. 2014/0001267;
U.S. Patent Application Publication No. 2014/0002828;
U.S. Patent Application Publication No. 2014/0008430;
U.S. Patent Application Publication No. 2014/0008439;
U.S. Patent Application Publication No. 2014/0025584;
U.S. Patent Application Publication No. 2014/0027518;
U.S. Patent Application Publication No. 2014/0034734;
U.S. Patent Application Publication No. 2014/0036848;
U.S. Patent Application Publication No. 2014/0039693;
U.S. Patent Application Publication No. 2014/0042814;

U.S. Patent Application Publication No. 2014/0049120;
U.S. Patent Application Publication No. 2014/0049635;
U.S. Patent Application Publication No. 2014/0061305;
U.S. Patent Application Publication No. 2014/0061306;
U.S. Patent Application Publication No. 2014/0063289;
U.S. Patent Application Publication No. 2014/0066136;
U.S. Patent Application Publication No. 2014/0067692;
U.S. Patent Application Publication No. 2014/0070005;
U.S. Patent Application Publication No. 2014/0071840;
U.S. Patent Application Publication No. 2014/0074746;
U.S. Patent Application Publication No. 2014/0075846;
U.S. Patent Application Publication No. 2014/0076974;
U.S. Patent Application Publication No. 2014/0078341;
U.S. Patent Application Publication No. 2014/0078342;
U.S. Patent Application Publication No. 2014/0078345;
U.S. Patent Application Publication No. 2014/0084068;
U.S. Patent Application Publication No. 2014/0097249;
U.S. Patent Application Publication No. 2014/0098792;
U.S. Patent Application Publication No. 2014/0100774;
U.S. Patent Application Publication No. 2014/0100813;
U.S. Patent Application Publication No. 2014/0103115;
U.S. Patent Application Publication No. 2014/0104413;
U.S. Patent Application Publication No. 2014/0104414;
U.S. Patent Application Publication No. 2014/0104416;
U.S. Patent Application Publication No. 2014/0104451;
U.S. Patent Application Publication No. 2014/0106594;
U.S. Patent Application Publication No. 2014/0106725;
U.S. Patent Application Publication No. 2014/0108010;
U.S. Patent Application Publication No. 2014/0108402;
U.S. Patent Application Publication No. 2014/0108682;
U.S. Patent Application Publication No. 2014/0110485;
U.S. Patent Application Publication No. 2014/0114530;
U.S. Patent Application Publication No. 2014/0124577;
U.S. Patent Application Publication No. 2014/0124579;
U.S. Patent Application Publication No. 2014/0125842;
U.S. Patent Application Publication No. 2014/0125853;
U.S. Patent Application Publication No. 2014/0125999;
U.S. Patent Application Publication No. 2014/0129378;
U.S. Patent Application Publication No. 2014/0131438;
U.S. Patent Application Publication No. 2014/0131441;
U.S. Patent Application Publication No. 2014/0131443;
U.S. Patent Application Publication No. 2014/0131444;
U.S. Patent Application Publication No. 2014/0131445;
U.S. Patent Application Publication No. 2014/0131448;
U.S. Patent Application Publication No. 2014/0133379;
U.S. Patent Application Publication No. 2014/0136208;
U.S. Patent Application Publication No. 2014/0140585;
U.S. Patent Application Publication No. 2014/0151453;
U.S. Patent Application Publication No. 2014/0152882;
U.S. Patent Application Publication No. 2014/0158770;
U.S. Patent Application Publication No. 2014/0159869;
U.S. Patent Application Publication No. 2014/0160329;
U.S. Patent Application Publication No. 2014/0166755;
U.S. Patent Application Publication No. 2014/0166757;
U.S. Patent Application Publication No. 2014/0166759;
U.S. Patent Application Publication No. 2014/0166760;
U.S. Patent Application Publication No. 2014/0166761;
U.S. Patent Application Publication No. 2014/0168787;
U.S. Patent Application Publication No. 2014/0175165;
U.S. Patent Application Publication No. 2014/0175169;
U.S. Patent Application Publication No. 2014/0175172;
U.S. Patent Application Publication No. 2014/0175174;
U.S. Patent Application Publication No. 2014/0191644;
U.S. Patent Application Publication No. 2014/0191913;
U.S. Patent Application Publication No. 2014/0197238;
U.S. Patent Application Publication No. 2014/0197239;
U.S. Patent Application Publication No. 2014/0197304;
U.S. Patent Application Publication No. 2014/0203087;
U.S. Patent Application Publication No. 2014/0204268;
U.S. Patent Application Publication No. 2014/0214631;
U.S. Patent Application Publication No. 2014/0217166;
U.S. Patent Application Publication No. 2014/0217180;
U.S. patent application Ser. No. 13/367,978 for a Laser Scanning Module Employing An Elastomeric U-Hinge Based Laser Scanning Assembly, filed Feb. 7, 2012 (Feng et al.);
U.S. patent application Ser. No. 29/436,337 for an Electronic Device, filed Nov. 5, 2012 (Fitch et al.);
U.S. patent application Ser. No. 13/771,508 for an Optical Redirection Adapter, filed Feb. 20, 2013 (Anderson);
U.S. patent application Ser. No. 13/852,097 for a System and Method for Capturing and Preserving Vehicle Event Data, filed Mar. 28, 2013 (Barker et al.);
U.S. patent application Ser. No. 13/902,110 for a System and Method for Display of Information Using a Vehicle-Mount Computer, filed May 24, 2013 (Hollifield);
U.S. patent application Ser. No. 13/902,144, for a System and Method for Display of Information Using a Vehicle-Mount Computer, filed May 24, 2013 (Chamberlin);
U.S. patent application Ser. No. 13/902,242 for a System For Providing A Continuous Communication Link With A Symbol Reading Device, filed May 24, 2013 (Smith et al.);
U.S. patent application Ser. No. 13/912,262 for a Method of Error Correction for 3D Imaging Device, filed Jun. 7, 2013 (Jovanovski et al.);
U.S. patent application Ser. No. 13/912,702 for a System and Method for Reading Code Symbols at Long Range Using Source Power Control, filed Jun. 7, 2013 (Xian et al.);
U.S. patent application Ser. No. 29/458,405 for an Electronic Device, filed Jun. 19, 2013 (Fitch et al.);
U.S. patent application Ser. No. 13/922,339 for a System and Method for Reading Code Symbols Using a Variable Field of View, filed Jun. 20, 2013 (Xian et al.);
U.S. patent application Ser. No. 13/927,398 for a Code Symbol Reading System Having Adaptive Autofocus, filed Jun. 26, 2013 (Todeschini);
U.S. patent application Ser. No. 13/930,913 for a Mobile Device Having an Improved User Interface for Reading Code Symbols, filed Jun. 28, 2013 (Gelay et al.);
U.S. patent application Ser. No. 29/459,620 for an Electronic Device Enclosure, filed Jul. 2, 2013 (London et al.);
U.S. patent application Ser. No. 29/459,681 for an Electronic Device Enclosure, filed Jul. 2, 2013 (Chaney et al.);
U.S. patent application Ser. No. 13/933,415 for an Electronic Device Case, filed Jul. 2, 2013 (London et al.);
U.S. patent application Ser. No. 29/459,785 for a Scanner and Charging Base, filed Jul. 3, 2013 (Fitch et al.);
U.S. patent application Ser. No. 29/459,823 for a Scanner, filed Jul. 3, 2013 (Zhou et al.);
U.S. patent application Ser. No. 13/947,296 for a System and Method for Selectively Reading Code Symbols, filed Jul. 22, 2013 (Rueblinger et al.);
U.S. patent application Ser. No. 13/950,544 for a Code Symbol Reading System Having Adjustable Object Detection, filed Jul. 25, 2013 (Jiang);
U.S. patent application Ser. No. 13/961,408 for a Method for Manufacturing Laser Scanners, filed Aug. 7, 2013 (Saber et al.);
U.S. patent application Ser. No. 14/018,729 for a Method for Operating a Laser Scanner, filed Sep. 5, 2013 (Feng et al.);
U.S. patent application Ser. No. 14/019,616 for a Device Having Light Source to Reduce Surface Pathogens, filed Sep. 6, 2013 (Todeschini);

U.S. patent application Ser. No. 14/023,762 for a Handheld Indicia Reader Having Locking Endcap, filed Sep. 11, 2013 (Gannon);

U.S. patent application Ser. No. 14/035,474 for Augmented-Reality Signature Capture, filed Sep. 24, 2013 (Todeschini);

U.S. patent application Ser. No. 29/468,118 for an Electronic Device Case, filed Sep. 26, 2013 (Oberpriller et al.);

U.S. patent application Ser. No. 14/055,234 for Dimensioning System, filed Oct. 16, 2013 (Fletcher);

U.S. patent application Ser. No. 14/053,314 for Indicia Reader, filed Oct. 14, 2013 (Huck);

U.S. patent application Ser. No. 14/065,768 for Hybrid System and Method for Reading Indicia, filed Oct. 29, 2013 (Meier et al.);

U.S. patent application Ser. No. 14/074,746 for Self-Checkout Shopping System, filed Nov. 8, 2013 (Hejl et al.);

U.S. patent application Ser. No. 14/074,787 for Method and System for Configuring Mobile Devices via NFC Technology, filed Nov. 8, 2013 (Smith et al.);

U.S. patent application Ser. No. 14/087,190 for Optimal Range Indicators for Bar Code Validation, filed Nov. 22, 2013 (Hejl);

U.S. patent application Ser. No. 14/094,087 for Method and System for Communicating Information in an Digital Signal, filed Dec. 2, 2013 (Peake et al.);

U.S. patent application Ser. No. 14/101,965 for High Dynamic-Range Indicia Reading System, filed Dec. 10, 2013 (Xian);

U.S. patent application Ser. No. 14/150,393 for Inciciareader Having Unitary Construction Scanner, filed Jan. 8, 2014 (Colavito et al.);

U.S. patent application Ser. No. 14/154,207 for Laser Barcode Scanner, filed Jan. 14, 2014 (Hou et al.);

U.S. patent application Ser. No. 14/165,980 for System and Method for Measuring Irregular Objects with a Single Camera filed Jan. 28, 2014 (Li et al.);

U.S. patent application Ser. No. 14/166,103 for Indicia Reading Terminal Including Optical Filter filed Jan. 28, 2014 (Lu et al.);

U.S. patent application Ser. No. 14/200,405 for Indicia Reader for Size-Limited Applications filed Mar. 7, 2014 (Feng et al.);

U.S. patent application Ser. No. 14/231,898 for Hand-Mounted Indicia-Reading Device with Finger Motion Triggering filed Apr. 1, 2014 (Van Horn et al.);

U.S. patent application Ser. No. 14/250,923 for Reading Apparatus Having Partial Frame Operating Mode filed Apr. 11, 2014, (Deng et al.);

U.S. patent application Ser. No. 14/257,174 for Imaging Terminal Having Data Compression filed Apr. 21, 2014, (Barber et al.);

U.S. patent application Ser. No. 14/257,364 for Docking System and Method Using Near Field Communication filed Apr. 21, 2014 (Showering);

U.S. patent application Ser. No. 14/264,173 for Autofocus Lens System for Indicia Readers filed Apr. 29, 2014 (Ackley et al.);

U.S. patent application Ser. No. 14/274,858 for Mobile Printer with Optional Battery Accessory filed May 12, 2014 (Marty et al.);

U.S. patent application Ser. No. 14/277,337 for MULTIPURPOSE OPTICAL READER, filed May 14, 2014 (Jovanovski et al.);

U.S. patent application Ser. No. 14/283,282 for TERMINAL HAVING ILLUMINATION AND FOCUS CONTROL filed May 21, 2014 (Liu et al.);

U.S. patent application Ser. No. 14/300,276 for METHOD AND SYSTEM FOR CONSIDERING INFORMATION ABOUT AN EXPECTED RESPONSE WHEN PERFORMING SPEECH RECOGNITION, filed Jun. 10, 2014 (Braho et al.);

U.S. patent application Ser. No. 14/305,153 for INDICIA READING SYSTEM EMPLOYING DIGITAL GAIN CONTROL filed Jun. 16, 2014 (Xian et al.);

U.S. patent application Ser. No. 14/310,226 for AUTOFOCUSING OPTICAL IMAGING DEVICE filed Jun. 20, 2014 (Koziol et al.);

U.S. patent application Ser. No. 14/327,722 for CUSTOMER FACING IMAGING SYSTEMS AND METHODS FOR OBTAINING IMAGES filed Jul. 10, 2014 (Oberpriller et al,);

U.S. patent application Ser. No. 14/327,827 for a MOBILE-PHONE ADAPTER FOR ELECTRONIC TRANSACTIONS, filed Jul. 10, 2014 (Hejl);

U.S. patent application Ser. No. 14/329,303 for CELL PHONE READING MODE USING IMAGE TIMER filed Jul. 11, 2014 (Coyle);

U.S. patent application Ser. No. 14/333,588 for SYMBOL READING SYSTEM WITH INTEGRATED SCALE BASE filed Jul. 17, 2014 (Barten);

U.S. patent application Ser. No. 14/334,934 for a SYSTEM AND METHOD FOR INDICIA VERIFICATION, filed Jul. 18, 2014 (Hejl);

U.S. patent application Ser. No. 14/336,188 for METHOD OF AND SYSTEM FOR DETECTING OBJECT WEIGHING INTERFERENCES, Filed Jul. 21, 2014 (Amundsen et al.);

U.S. patent application Ser. No. 14/339,708 for LASER SCANNING CODE SYMBOL READING SYSTEM, filed Jul. 24, 2014 (Xian et al.);

U.S. patent application Ser. No. 14/340,627 for an AXIALLY REINFORCED FLEXIBLE SCAN ELEMENT, filed Jul. 25, 2014 (Reublinger et al.);

U.S. patent application Ser. No. 14/340,716 for an OPTICAL IMAGER AND METHOD FOR CORRELATING A MEDICATION PACKAGE WITH A PATIENT, filed Jul. 25, 2014 (Ellis);

U.S. patent application Ser. No. 14/342,544 for Imaging Based Barcode Scanner Engine with Multiple Elements Supported on a Common Printed Circuit Board filed Mar. 4, 2014 (Liu et al.);

U.S. patent application Ser. No. 14/345,735 for Optical Indicia Reading Terminal with Combined Illumination filed Mar. 19, 2014 (Ouyang);

U.S. patent application Ser. No. 14/336,188 for METHOD OF AND SYSTEM FOR DETECTING OBJECT WEIGHING INTERFERENCES, Filed Jul. 21, 2014 (Amundsen et al.);

U.S. patent application Ser. No. 14/355,613 for Optical Indicia Reading Terminal with Color Image Sensor filed May 1, 2014 (Lu et al.);

U.S. patent application Ser. No. 14/370,237 for WEB-BASED SCAN-TASK ENABLED SYSTEM AND METHOD OF AND APPARATUS FOR DEVELOPING AND DEPLOYING THE SAME ON A CLIENT-SERVER NETWORK filed Jul. 2, 2014 (Chen et al.);

U.S. patent application Ser. No. 14/370,267 for INDUSTRIAL DESIGN FOR CONSUMER DEVICE BASED SCANNING AND MOBILITY, filed Jul. 2, 2014 (Ma et al.);

U.S. patent application Ser. No. 14/376,472, for an ENCODED INFORMATION READING TERMINAL INCLUDING HTTP SERVER, filed Aug. 4, 2014 (Lu);

U.S. patent application Ser. No. 14/379,057 for METHOD OF USING CAMERA SENSOR INTERFACE TO TRANSFER MULTIPLE CHANNELS OF SCAN DATA USING AN IMAGE FORMAT filed Aug. 15, 2014 (Wang et al.);

U.S. patent application Ser. No. 14/452,697 for INTERACTIVE INDICIA READER, filed Aug. 6, 2014 (Todeschini);

U.S. patent application Ser. No. 14/453,019 for DIMENSIONING SYSTEM WITH GUIDED ALIGNMENT, filed Aug. 6, 2014 (Li et al.);

U.S. patent application Ser. No. 14/460,387 for APPARATUS FOR DISPLAYING BAR CODES FROM LIGHT EMITTING DISPLAY SURFACES filed Aug. 15, 2014 (Van Horn et al.);

U.S. patent application Ser. No. 14/460,829 for ENCODED INFORMATION READING TERMINAL WITH WIRELESS PATH SELECTON CAPABILITY, filed Aug. 15, 2014 (Wang et al.);

U.S. patent application Ser. No. 14/462,801 for MOBILE COMPUTING DEVICE WITH DATA COGNITION SOFTWARE, filed on Aug. 19, 2014 (Todeschini et al.);

U.S. atent application Ser. No. 14/446,387 for INDICIA READING TERMINAL PROCESSING PLURALITY OF FRAMES OF IMAGE DATA RESPONSIVELY TO TRIGGER SIGNAL ACTIVATION filed Jul. 30, 2014 (Wang et al.);

U.S. patent application Ser. No. 14/446,391 for MULTIFUNCTION POINT OF SALE APPARATUS WITH OPTICAL SIGNATURE CAPTURE filed Jul. 30, 2014 (Good et al.);

U.S. patent application Ser. No. 29/486,759 for an Imaging Terminal, filed Apr. 2, 2014 (Oberpriller et al.);

U.S. patent application Ser. No. 29/492,903 for an INDICIA SCANNER, filed Jun. 4, 2014 (Zhou et al.); and U.S. patent application Ser. No. 29/494,725 for an IN-COUNTER BARCODE SCANNER, filed Jun. 24, 2014 (Oberpriller et al.).

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:

1. A method for generating measurement-conformance feedback using a handheld dimensioning system, the method comprising:
    capturing by a dimensioning-system image-sensor at least one image of at least one object in a handheld dimensioning-system field-of-view;
    computing by a dimensioning-system processor using the at least one image a measurement geometry, the measurement geometry being an orientation and spatial relationship between the handheld dimensioning-system and the imaged object;
    deriving by a dimensioning-system processor a measurement accuracy corresponding to the measurement geometry;
    identifying by a dimensioning-system processor at least one conformance criteria based on the measurement accuracy, the conformance criteria being a predetermined measurement accuracy standard or reference;
    obtaining by a dimensioning-system processor using the at least one image a dimension measurement;
    comparing by a dimensioning-system processor the dimension measurement to the conformance criteria; and
    generating by a dimensioning-system processor measurement-conformance feedback corresponding to the results of comparing the dimension measurement to the conformance criteria.

2. The method according to claim 1, wherein the captured image comprises a structured light pattern.

3. The method according to claim 1, wherein the measurement geometry comprises a distance between the at least one object and the handheld dimensioning system.

4. The method according to claim 1, wherein the measurement geometry comprises an angle formed between the handheld dimensioning system and two points on an object in the field-of-view.

5. The method according to claim 1, wherein the at least one conformance criteria corresponds to a multiple of the measurement accuracy.

6. The method according to claim 1, wherein the dimension measurement is a volume.

7. The method according to claim 1, wherein the dimension measurement comprises a length.

8. The method according to claim 1, wherein the dimension measurement comprises a surface area.

9. The method according to claim 1, wherein the dimension measurement comprises a plurality of dimension measurements.

10. The method according to claim 1, wherein the measurement-conformance feedback comprises a conformance message.

11. The method according to claim 1, wherein the measurement-conformance feedback comprises a non-conformance message.

12. The method according to claim 1, wherein the measurement-conformance feedback comprises an error message.

13. The method according to claim 1, wherein the measurement-conformance feedback comprises an adjustment message, wherein the adjustment message comprises instructive prompts to facilitate the adjustment of the measurement geometry in order to achieve measurement conformance.

14. The method according to claim 13, comprising after the measurement geometry is adjusted, repeating the steps of capturing, computing, deriving, identifying, obtaining, comparing, and generating.

15. The method according to claim 1, wherein the measurement-conformance feedback comprises a dimension measurement and a conformance message, the conformance message indicating whether the dimension measurement conforms or does not conform to the conformance criteria.

16. The method according to claim 1, wherein the measurement-conformance feedback comprises an error message, the error message indicating that a dimension measurement is unobtainable.

17. A handheld dimensioning system providing measurement-conformance feedback, the dimensioning system comprising:
    an imaging subsystem comprising at least one image sensor for capturing an image of at least one object within a field-of-view; and
    a control subsystem communicatively coupled to the at least one image sensor, the control subsystem comprising at least one processor and at least one non-transitory storage medium for storing information and processor-executable instructions, wherein the processor-executable instructions configure the processor to:

(i) receive images from the at least one image sensor, (ii) compute using the received images a measurement geometry, the measurement geometry being an orientation and spatial relationship between the handheld dimensioning-system and the imaged object, (iii) derive a measurement accuracy corresponding to the measurement geometry, (iv) identify a conformance criteria based on the measurement accuracy, the conformance criteria being a predetermined measurement accuracy standard or reference, (v) obtain using the received images a dimension measurement, and (vi) compare the dimension measurement to the conformance criteria in order to generate measurement-conformance feedback.

18. The handheld dimensioning system according to claim 17, wherein the handheld dimensioning system comprises a projector subsystem for projecting a light pattern onto the at least one object within the field-of-view, the projector subsystem laterally offset from the imaging subsystem and sharing the same field-of-view.

19. The handheld dimensioning system according to claim 17 wherein the handheld dimensioning system comprises two imaging subsystems for capturing images of at least one object as view along two different lines of sight, the imaging subsystems laterally offset from each other and sharing the same field-of-view.

20. The handheld dimensioning system according to claim 17, wherein the measurement geometry comprises the range between the imaging subsystem and an object within the field of view.

21. The handheld dimensioning system according to claim 17, wherein the measurement geometry comprises detected object surfaces.

22. The handheld dimensioning system according to claim 21, wherein the measurement geometry comprises the number of object surfaces that the imaging subsystem can resolve.

23. The handheld dimensioning system according to claim 22, wherein the measurement-conformance feedback indicates that an object is unmeasurable when less than three surfaces can be resolved.

24. The handheld dimensioning system according to claim 17, wherein the measurement accuracy is inversely proportional to the range between the imaging subsystem and an object within the field of view.

25. The handheld dimensioning system according to claim 17, wherein the conformance criteria is proportional to the computed accuracy.

26. The handheld dimensioning system according to claim 17, wherein the conformance criteria is in compliance with the specifications for dimension measuring devices described in the 2013 edition of the NIST Handbook 44, section 5.58.

27. The handheld dimensioning system according to claim 26, wherein the conformance criteria is twelve times the computed accuracy.

28. The handheld dimensioning system according to claim 17, wherein the measurement-conformance feedback indicates that the dimension measurement is in conformance with a measurement-accuracy criteria when the dimension measurement is above the conformance criteria.

29. The handheld dimensioning system according to claim 17, wherein the measurement-conformance feedback comprises a certified measurement.

30. The handheld dimensioning system according to claim 17, wherein the measurement-conformance feedback comprises advice for adjusting the handheld dimensioning system with respect to the at least one object.

31. The handheld dimensioning system according to claim 17, wherein the dimension measurement comprises incremental distances to an object and the angles of the various surfaces.

32. The handheld dimensioning system according to claim 17, wherein the dimension measurement comprises the dimension measurements of a plurality of objects and the measurement-conformance feedback comprises feedback for each object.

* * * * *